(12) United States Patent
Amano

(10) Patent No.: US 8,964,301 B2
(45) Date of Patent: Feb. 24, 2015

(54) ZOOM LENS FOR PROJECTION AND PROJECTION-TYPE DISPLAY APPARATUS

(71) Applicant: FUJIFILM Corporation, Tokyo (JP)

(72) Inventor: Masaru Amano, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/257,321

(22) Filed: Apr. 21, 2014

(65) Prior Publication Data

US 2014/0226217 A1  Aug. 14, 2014

Related U.S. Application Data

(63) Continuation of application No. PCT/JP2012/006556, filed on Oct. 12, 2012.

(30) Foreign Application Priority Data

Oct. 20, 2011  (JP) ................................. 2011-230295

(51) Int. Cl.
| | |
|---|---|
| *G02B 15/04* | (2006.01) |
| *G02B 13/04* | (2006.01) |
| *G02B 13/16* | (2006.01) |
| *G02B 13/22* | (2006.01) |
| *G02B 15/177* | (2006.01) |

(52) U.S. Cl.
CPC ................ *G02B 13/04* (2013.01); *G02B 15/04* (2013.01); *G02B 13/16* (2013.01); *G02B 13/22* (2013.01); *G02B 15/177* (2013.01)
USPC ............................ 359/680; 359/682; 359/676

(58) Field of Classification Search
CPC ...... G02B 15/04; G02B 15/177; G02B 13/04; G02B 13/009
USPC ........... 348/345; 359/676, 679, 680, 681, 682
See application file for complete search history.

(56) References Cited

U.S. PATENT DOCUMENTS

| | | | | |
|---|---|---|---|---|
| 7,773,309 | B2* | 8/2010 | Amano | ......................... 359/683 |
| 2007/0285802 | A1 | 12/2007 | Sugita | |
| 2010/0309562 | A1 | 12/2010 | Amano | |

FOREIGN PATENT DOCUMENTS

| | | |
|---|---|---|
| JP | 2007-248840 | 9/2007 |
| JP | 2007-328163 | 12/2007 |
| JP | 2010-282147 | 12/2010 |

OTHER PUBLICATIONS

International Search Report, PCTJP2012/006556, Feb. 26, 2013.

* cited by examiner

*Primary Examiner* — David N Spector
(74) *Attorney, Agent, or Firm* — Young & Thompson

(57) ABSTRACT

A zoom lens for projection substantially consists of a first lens-group having negative refractive power, and a second lens-group through a fifth lens-group having positive refractive power, arranged in this order from a magnification side. The zoom lens is configured to be telecentric on a reduction side. The first lens-group and the fifth lens-group are fixed while the second lens-group through the fourth lens-group move during magnification change. The fourth lens-group includes at least three positive lenses, and a most-magnification-side lens in the fourth lens-group has a convex surface facing the magnification side. Further, when a focal length of an entire system at a wide angle end is fw, and a focal length of the fourth lens-group is f4, and a full angle of view at a wide angle end is 2ω, conditional formulas (1) and (7) are satisfied:

$7.5 < f4/fw < 14.5$  (1); and $70° \leq 2\omega$  (7).

14 Claims, 15 Drawing Sheets

EXAMPLE 1

FIG.3 EXAMPLE 3

EXAMPLE 5

FIG.13
EXAMPLE 1
WIDE ANGLE END
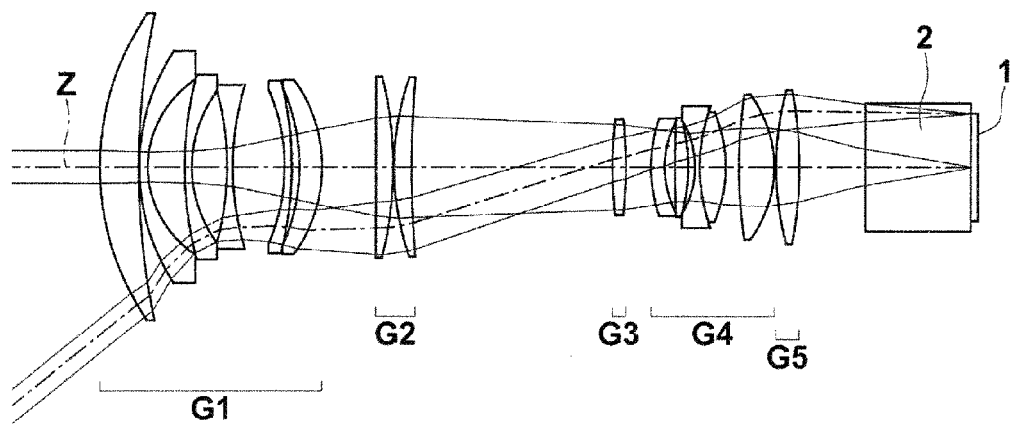
TELEPHOTO END
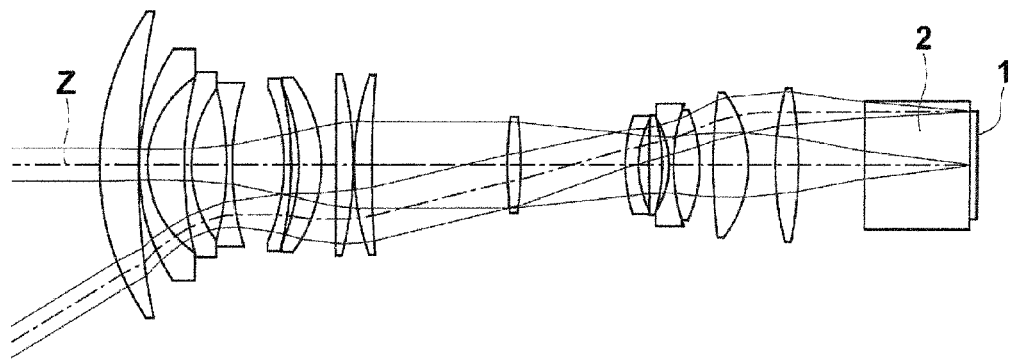

ZOOM LENS FOR PROJECTION AND PROJECTION-TYPE DISPLAY APPARATUS

BACKGROUND OF THE INVENTION

1. Field of the Invention

The present invention relates to a zoom lens, and particularly to a zoom lens for projection applicable to a projection-type display apparatus.

Further, the present invention relates to a projection-type display apparatus including such a zoom lens for projection.

2. Description of the Related Art

Recently, projection-type display apparatuses, such as a transmission-type or reflection-type liquid crystal display apparatus and a DMD display apparatus, using light valves became widely used. Projection lenses used in such kinds of projection-type display apparatuses generally need to have long back focus. Further, an entrance pupil of such a projection lens viewed from a reduction side (light valve side) needs to be located sufficiently far. In other words, the projection lens needs to have telecentricity on the reduction side. Further, the projection lens needs to have a variable magnification function (zoom function), considering the portability of the apparatus and the adaptability of the apparatus to setting conditions. Further, the projection lens needs to have a wide angle of view to satisfy a requirement of projection onto a large screen from a short distance.

Conventionally, for example, the following Japanese Unexamined Patent Publication No. 2007-248840 (Patent Document 1), Japanese Unexamined Patent Publication No. 2007-328163 (Patent Document 2), and Japanese Unexamined Patent Publication NO. 2010-282147 (Patent Document 3) and the like proposed five-group zoom lenses, in which three lens groups are moved during magnification change. Further, the zoom lenses are configured to be telecentric on a short conjugate length side, in other words, a reduction side.

In the zoom lenses disclosed in Patent Documents 1 through 3, a first lens group having negative refractive power, a second lens group having positive refractive power, a third lens group having positive refractive power, a fourth lens group having positive refractive power, and a fifth lens group having positive refractive power are arranged in this order from a magnification side. The zoom lenses are configured in such a manner that the first lens group and the fifth lens group are fixed while the second lens group through the fourth lens group move during magnification change. The zoom lenses are configured so as to suppress a fluctuation of various aberrations caused by magnification change to a relatively low level.

SUMMARY OF THE INVENTION

However, in all the zoom lenses disclosed in Patent Documents 1 through 3, angles of view are only about 60 degrees, which do not satisfy the recent need for wider angles of view.

In view of the foregoing circumstances, it is an object of the present invention to provide a zoom lens for projection with a wider angle of view of for example 70 degrees or wider, and in which various aberrations are excellently correctable through an entire range of variable magnification.

Further, it is an object of the present invention to provide a projection-type display apparatus including the zoom lens for projection, as described above, and which can display images with high image qualities.

A zoom lens for projection of the present invention is a zoom lens for projection substantially consisting of:

a first lens group having negative refractive power;
a second lens group having positive refractive power;
a third lens group having positive refractive power;
a fourth lens group having positive refractive power; and
a fifth lens group having positive refractive power, which are arranged in this order from a magnification side, wherein the zoom lens is configured to be telecentric on a reduction side, and wherein the zoom lens is configured in such a manner that the first lens group and the fifth lens group are fixed while the second lens group through the fourth lens group move along an optical axis during magnification change, and wherein the fourth lens group includes at least three positive lenses, and wherein a most-magnification-side lens in the fourth lens group has a convex surface facing the magnification side, and wherein the following conditional formula is satisfied when a focal length of an entire system at a wide angle end is fw and a focal length of the fourth lens group is f4:

$$7.5 < f4/fw < 14.5 \quad (1).$$

Here, the expression "substantially consisting of: . . . a fifth lens group . . . , which are arranged" means that lenses substantially without any refractive power, optical elements other than lenses, such as a stop and a cover glass, mechanical parts, such as a lens flange, a lens barrel, an imaging device, and a hand shake blur correction mechanism, and the like may be included in addition to the mentioned lens groups. Hereinafter, the term "substantially" will be used always in the same meaning as the above definition.

Further, the expression "telecentric on a reduction side" represents a state in which a bisector of an angle between the maximum ray on the upper side and the maximum ray on the lower side in a cross section of rays converging at an arbitrary point on a reduction-side image plane is nearly parallel to an optical axis. The expression does not mean only a completely telecentric case, i.e., a case in which the bisector of the angle is completely parallel to the optical axis. The expression also means a case with some error. Here, the case with some error means that the inclination of the bisector of the angle with respect to the optical axis is within a range of ±3°.

In the zoom lens for projection of the present invention, a cemented lens may be used as lenses constituting each lens group. When a cemented lens consists of n number of lenses cemented together, the cemented lens is counted as n number of lenses.

In the zoom lens for projection of the present invention, the surface shape of a lens and the sign of the refractive power of a lens are considered in a paraxial region when the lens includes an aspherical surface.

In the zoom lens for projection of the present invention, it is more desirable that especially the following conditional formula is satisfied in the range defined by the aforementioned conditional formula (1):

$$8.0 < f4/fw < 13.0 \quad (1').$$

In the zoom lens for projection of the present invention, it is desirable that the following conditional formula is satisfied when an average of Abbe numbers of positive lenses included in the fourth lens group for d-line is ν4a:

$$60.0 < \nu 4a \quad (2).$$

Further, it is more desirable that especially the following conditional formula is satisfied in the range defined by the aforementioned conditional formula (2):

$$62.0 < \nu 4a \quad (2').$$

In the zoom lens for projection of the present invention, it is desirable that the following conditional formula is satisfied when an average of an Abbe number or numbers of a positive lens or lenses included in the fifth lens group for d-line is ν5a:

$$50.0 < \nu 5a \quad (3).$$

Further, it is more desirable that especially the following conditional formula is satisfied in the range defined by the aforementioned conditional formula (3):

$$55.0 < \nu 5a \quad (3').$$

In the zoom lens for projection of the present invention, it is desirable that the following conditional formula is satisfied when a curvature radius of a magnification-side surface of the most-magnification-side lens or a most-magnification-side lens unit in the fourth lens group is R4f and a curvature radius of a reduction-side surface of the most-magnification-side lens or the most-magnification-side lens unit in the fourth lens group is R4r:

$$2.5 < (R4f + R4r)/(R4f - R4r) < 7.0 \quad (4).$$

Here, the term "lens unit" represents a whole cemented lens particularly when the cemented lens is arranged on the most magnification side in the fourth lens group.

Further, it is more desirable that especially the following conditional formula is satisfied in the range defined by the aforementioned conditional formula (4):

$$3.5 < (R4f + R4r)/(R4f - R4r) < 6.5 \quad (4').$$

In the zoom lens for projection of the present invention, it is desirable that the following conditional formula is satisfied when a focal length of an entire system at a wide angle end is fw and a focal length of the fifth lens group is f5:

$$3.0 < f5/fw < 7.0 \quad (5).$$

Further, it is more desirable that especially the following conditional formula is satisfied in the range defined by the aforementioned conditional formula (5):

$$3.5 < f5/fw < 6.0 \quad (5').$$

In the zoom lens for projection of the present invention, it is desirable that the following conditional formula is satisfied when a focal length of an entire system at a wide angle end is fw and a back focus of the entire system (a distance in air) is Bf:

$$1.5 < Bf/fw < 3.0 \quad (6).$$

Here, the back focus is a back focus when a magnification side is regarded as an object side and a reduction side is regarded as an image side.

Further, it is more desirable that especially the following conditional formula is satisfied in the range defined by the aforementioned conditional formula (6):

$$1.7 < Bf/fw < 2.5 \quad (6').$$

In the zoom lens for projection of the present invention, it is desirable that the following conditional formula is satisfied when a full angle of view at a wide angle end is 2ω:

$$70° \le 2\omega \quad (7).$$

Further, it is desirable that the zoom lens for projection of the present invention adopts an inner focus structure in which focusing is performed by moving, in a direction of the optical axis, only two lenses present on a reduction side in the first lens group.

Meanwhile, a projection-type display apparatus of the present invention includes the zoom lens for projection of the present invention, as described above, in addition to a light source, a light valve and an illumination optical unit that guides rays from the light source to the light valve. The projection-type display apparatus includes a structure in which light modulation is performed on the rays from the light source at the light valve, and the rays are projected onto a screen by the zoom lens for projection.

The zoom lens for projection of the present invention substantially consists of a first lens group having negative refractive power, a second lens group having positive refractive power, a third lens group having positive refractive power, a fourth lens group having positive refractive power and a fifth lens group having positive refractive power, which are arranged in this order from a magnification side. Further, the zoom lens is configured to be telecentric on a reduction side. The zoom lens is configured in such a manner that the first lens group and the fifth lens group are fixed while the second lens group through the fourth lens group move along an optical axis during magnification change. Further, the fourth lens group includes at least three positive lenses, and a most-magnification-side lens in the fourth lens group has a convex surface facing the magnification side. Further, the aforementioned conditional formula (1) is satisfied. Therefore, the following effects are achievable.

Specifically, first, plural lens groups that move during magnification change are substantially the second lens group having positive refractive power, the third lens group having positive refractive power and the fourth lens having positive refractive power, which are arranged in this order from the magnification side. Therefore, it is possible to excellently correct various aberrations by a small number of lenses.

Further, three or more positive lenses are used in the fourth lens group. Therefore, it is possible to achieve excellent telecentricity. Further, although it tends to be difficult to provide a long back focus in a wide angle lens, it is possible to appropriately secure a back focus. Further, since a lens with a convex surface facing the magnification side is used as the most-magnification-side lens in the fourth lens group, it is possible to excellently correct a spherical aberration and astigmatism.

Meanwhile, conditional formula (1) defines the ratio of a focal length of the fourth lens group to a focal length of the entire system at a wide angle end. It is difficult to excellently correct curvature of field (especially, curvature of a sagittal image plane) if the value is lower than the lower limit of conditional formula (1) or exceeds the upper limit of conditional formula (1). When conditional formula (1) is satisfied, it is possible to prevent such drawbacks, and to excellently correct curvature of field through an entire variable magnification range. This effect is more remarkable especially when the aforementioned conditional formula (1') is satisfied in the range defined by conditional formula (1).

In the zoom lens for projection of the present invention, especially when the aforementioned conditional formula (2) is satisfied, the following effects are achievable. Specifically, conditional formula (2) defines an average of Abbe numbers of positive lenses included in the fourth lens group. If the value is lower than the lower limit of the conditional formula, it becomes difficult to excellently correct a lateral chromatic aberration. When conditional formula (2) is satisfied, it is possible to prevent such drawbacks, and to excellently correct a lateral chromatic aberration.

This effect is more remarkable especially when the aforementioned conditional formula (2') is satisfied in the range defined by conditional formula (2).

In the zoom lens for projection of the present invention, especially when the aforementioned conditional formula (3) is satisfied, the following effects are achievable. Specifically, conditional formula (3) defines an average of an Abbe number or numbers of a positive lens or lenses included in the fifth lens group. If the value is lower than the lower limit of this conditional formula, it becomes difficult to excellently correct a lateral chromatic aberration. When conditional formula (3) is satisfied, it is possible to prevent such drawbacks, and to excellently correct a lateral chromatic aberration.

This effect is more remarkable especially when the aforementioned conditional formula (3') is satisfied in the range defined by conditional formula (3).

In the zoom lens for projection of the present invention, especially when the aforementioned conditional formula (4) is satisfied, the following effects are achievable. Specifically, conditional formula (4) defines a relationship between a curvature radius of a magnification-side surface of the most-magnification-side lens or a most-magnification-side lens unit in the fourth lens group and a curvature radius of its reduction-side surface. If the value is lower than the lower limit of conditional formula (4) or exceeds the upper limit of conditional formula (4), it becomes difficult to excellently correct a spherical aberration and astigmatism. When conditional formula (4) is satisfied, it is possible to prevent such drawbacks, and to excellently correct a spherical aberration and astigmatism.

This effect is more remarkable especially when the aforementioned conditional formula (4') is satisfied in the range defined by conditional formula (4).

In the zoom lens for projection of the present invention, especially when the aforementioned conditional formula (5) is satisfied, the following effects are achievable. Specifically, conditional formula (5) defines the ratio of the focal length of the fifth lens group to the focal length of the entire system at a wide angle end. If the value is lower than the lower limit of conditional formula (5), the refractive power of the fifth lens group becomes too strong, and a back focus becomes short. Further, the amount of generated lateral chromatic aberrations becomes large, and correction of the lateral chromatic aberrations by the other lens groups becomes difficult. On the contrary, if the value exceeds the upper limit of conditional formula (5), the refractive power of the fifth lens group becomes too weak, and it becomes difficult to secure necessary telecentricity. When conditional formula (5) is satisfied, it is possible to prevent such drawbacks, and to excellently correct a lateral chromatic aberration. Further, it is possible to secure excellent telecentricity.

This effect is more remarkable especially when the aforementioned conditional formula (5') is satisfied in the range defined by conditional formula (5).

In the zoom lens for projection of the present invention, especially when the aforementioned conditional formula (6) is satisfied, the following effects are achievable. Specifically, conditional formula (6) defines the ratio of the back focus of the entire system to the focal length of the entire system at a wide angle end. If the value is lower than the lower limit of conditional formula (6), it becomes difficult to insert a glass block, such as a prism, which is generally arranged on the rear side (reduction side) of the zoom lens for projection in a projection-type display apparatus. On the contrary, if the value exceeds the upper limit of conditional formula (6), the total lens length becomes long. When conditional formula (6) is satisfied, it is possible to prevent such drawbacks, and to easily insert the glass block. Further, it is possible to suppress the total lens length so that the length is short.

This effect is more remarkable especially when the aforementioned conditional formula (6') is satisfied in the range defined by conditional formula (6).

In the zoom lens for projection of the present invention, especially when the aforementioned conditional formula (7) is satisfied, it is possible to sufficiently satisfy a need for a wider angle of view, which is required recently in a zoom lens for projection.

Further, in the zoom lens for projection of the present invention, especially when an inner focus structure in which focusing is performed by moving, in a direction of the optical axis, only two lenses present on a reduction side in the first lens group is adopted, it is possible to excellently correct curvature of field without specially increasing the size of the lens.

Meanwhile, in the projection-type display apparatus of the present invention, the zoom lens of the present invention, which has been described, is adopted as a zoom lens for projection. Therefore, it is possible to satisfy a need for a wider angle of view. Further, it is possible to excellently suppress curvature of field, and to display images with high image qualities.

BRIEF DESCRIPTION OF THE DRAWINGS

FIG. 13 is a diagram illustrating paths of rays in the zoom lens for projection in Example 1;

DESCRIPTION OF THE PREFERRED EMBODIMENTS

Figure 1:
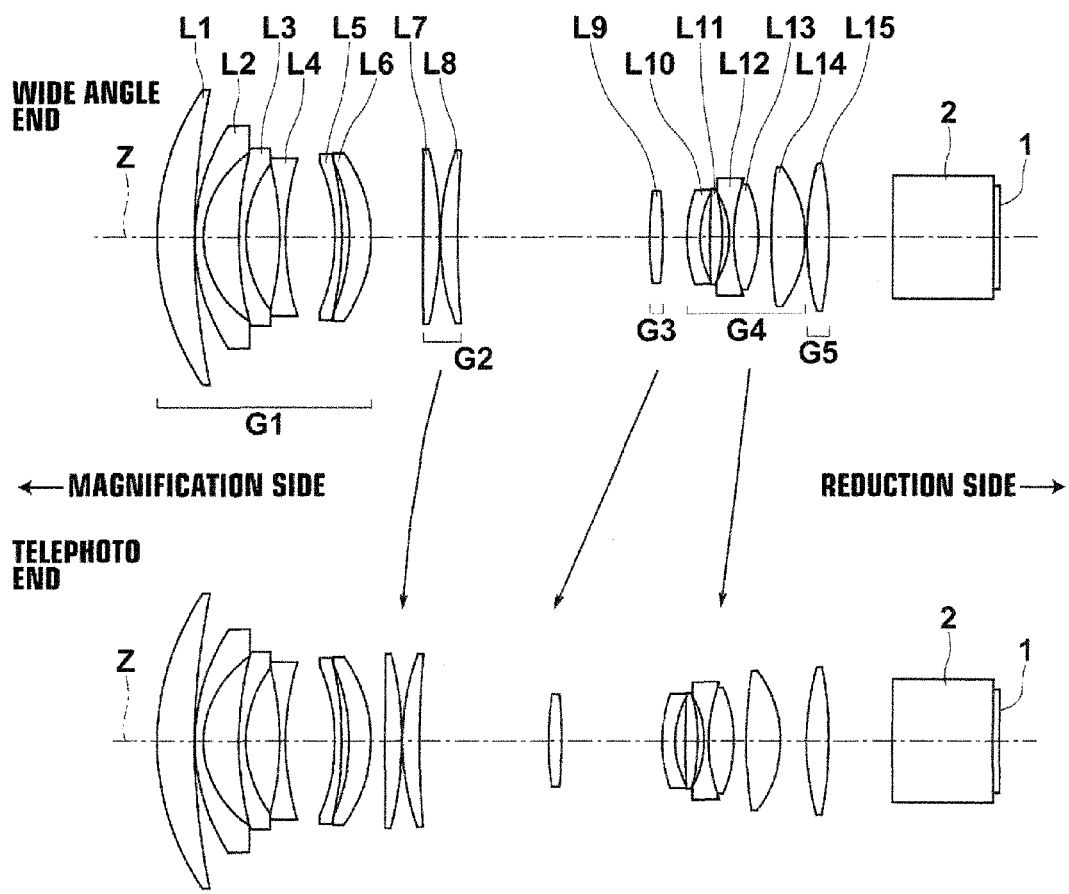
FIG. 1 is a cross section illustrating the lens structure of a zoom lens for projection in Example 1 of the present invention.

Next, embodiments of the present invention will be described in detail with reference to drawings. First, a zoom lens for projection according to an embodiment of the present invention will be described with reference to FIG. 1. FIG. 1 illustrates the moved position of each lens group at a wide angle end and at a telephoto end when a variable magnification operation is performed on the zoom lens for projection in Example 1 of the present invention. In this diagram, the direction of movement of a lens group that moves during change from a wide angle end to a telephoto end is schematically illustrated by an arrow between the positions.

Meanwhile, FIG. 2 through FIG. 6 are cross sections illustrating other structural examples according to the embodiments of the present invention. FIG. 2 through FIG. 6 correspond to zoom lenses for projection in Examples 2 through 6, which will be described later. The basic structures of these zoom lenses for projection are similar to the basic structure of the zoom lens for projection in Example 1. Therefore, the embodiments of the present invention will be described mainly by using the structure illustrated in FIG. 1, as an example.

The zoom lens for projection according to an embodiment of the present invention is usable, for example, as a projection lens for projecting image information displayed on a light valve onto a screen. In FIG. 1, the left side of the diagram is a magnification side, and the right side of the diagram is a reduction side. A case of mounting the zoom lens for projection in a projection-type display apparatus is considered, and a glass block 2, such as a color combination prism (including filters), and an image display surface 1 of a light valve located on a reduction-side surface of the glass block 2 are also illustrated.

In the projection-type display apparatus, rays to which image information is given at the image display surface 1 enter the zoom lens for projection through the glass block 2. Further, an image based on the image information is projected and displayed on a screen arranged on the left side of the paper surface, and which is not illustrated.

FIG. 1 illustrates an example in which the position of the reduction-side surface of the glass block 2 and the position of the image display surface 1 are the same. However, the present invention is not necessarily limited to this example. Further, FIG. 1 illustrates only one image display surface 1. The projection-type display apparatus may be structured so that a full color image is displayable by separating rays from a light source into three primary colors by a color separation optical system, and by providing three light valves for the respective primary colors.

The zoom lens for projection according to the embodiment of the present invention includes, as substantial lens groups, first lens group G1 having negative refractive power, second lens group G2 having positive refractive power, third lens group G3 having positive refractive power, fourth lens group G4 having positive refractive power, and fifth lens group G5 having positive refractive power, which are arranged in this order from a magnification side, and is configured to be telecentric on a reduction side. First lens group G1 and fifth lens group G5 are fixed during magnification change while second lens group G2, third lens group G3 and fourth lens group G4 are plural lens groups that move during magnification change (hereinafter referred to as "moving lens groups in magnification change").

In the example illustrated in FIG. 1, first lens group G1 consists of six lenses (first lens L1 through sixth lens L6), and second lens group G2 consists of two lenses (seventh lens L7 and eighth lens L8), and third lens group G3 consists of a lens (ninth lens L9), and fourth lens group G4 consists of five lenses (tenth lens L10 through 14th lens L14), and fifth lens group G5 consists of a lens (15 th lens L15).

Here, the number of a lens or lenses constituting each lens group of the zoom lens for projection of the present invention is not necessarily limited to the example illustrated in FIG. 1. For example, in the zoom lens for projection in Example 5, which will be described later, fourth lens group G4 consists of six lenses. In the zoom lens for projection in Example 6, which will be described later, third lens group G3 consists of two lenses.

The zoom lens for projection according to the embodiment of the present invention adopts an inner focus structure in which focusing is performed by moving only two lenses L3 and L4 arranged on a reduction side in first lens group G1, which is fixed during magnification change. Therefore, it is possible to excellently correct curvature of field without especially increasing the size of the lens.

Further, the zoom lens for projection according to the embodiment of the present invention is configured in such a manner that magnification is changed by moving three lens groups G2 through G4. Therefore, it is possible to excellently suppress curvature of field caused by a wider angle of view while simplifying the structure compared with a zoom lens in which four lens groups are moved to change magnification, or the like.

Further, in the zoom lens for projection according to the embodiment of the present invention, the moving lens groups in magnification change are second lens group G2 having positive refractive power, third lens group G3 having positive refractive power, and fourth lens group G4 having positive refractive power, which are arranged in this order from a magnification side. Therefore, in the zoom lens for projection according to the embodiment of the present invention, it is possible to excellently correct various aberrations using a small number of lenses.

Further, in the zoom lens for projection according to the embodiment of the present invention, fourth lens group G4 includes three positive lenses, namely, 11th lens L11, 13th lens L13 and 14th lens L14. Further, a most-magnification-side lens in fourth lens group G4, which is tenth lens L10, has a convex surface facing the magnification side. Further, when a focal length of an entire system at a wide angle end is fw, and a focal length of fourth lens group G4 is f4, the zoom lens for projection satisfies the aforementioned conditional formula:

$$7.5 < f4/fw < 14.5 \qquad (1).$$

Further, in the range defined by the aforementioned conditional formula (1), especially the following conditional formula (1') is also satisfied:

$$8.0 < f5/fw < 13.0 \qquad (1').$$

The value defined by the aforementioned conditional formula (1) for each example will be specifically explained later in detail with reference to Table 19 (similar also for conditional formulas that will be described later).

The zoom lens for projection according to the embodiment of the present invention is configured in such a manner to satisfy the aforementioned conditional formula (1), and also to satisfy the aforementioned conditional formula (1'). Therefore, it is possible to excellently correct curvature of field (especially curvature of a sagittal image plane) through an entire variable magnification range.

Further, when an average of Abbe numbers of positive lenses included in fourth lens group G4, in other words, 11th lens L11, 13th lens L13 and 14th lens L14 for d-line is ν4a, the zoom lens for projection according to the embodiment of the present invention satisfies the aforementioned conditional formula:

$$60.0 < \nu 4a \qquad (2).$$

Further, in the range defined by the aforementioned conditional formula (2), especially the following conditional formula (2') is also satisfied:

$$62.0<v4a \quad (2').$$

Therefore, in the zoom lens for projection according to the embodiment of the present invention, it is possible to excellently correct a lateral chromatic aberration.

Further, when an average of an Abbe number or numbers of a positive lens or lenses included in fifth lens group G5 for d-line, specifically, the Abbe number of 15th lens L15 for d-line in this example is v5a, the zoom lens for projection according to the embodiment of the present invention satisfies the aforementioned conditional formula:

$$50.0<v5a \quad (3).$$

Further, in the range defined by the aforementioned conditional formula (3), especially the following conditional formula (3') is also satisfied:

$$55.0<v5a \quad (3').$$

Therefore, in the zoom lens for projection according to the embodiment of the present invention, it is possible to excellently correct a lateral chromatic aberration also from this respect. Since the embodiment of the present invention satisfies both of the aforementioned conditional formulas (2') and (3'), it is possible to correct a lateral chromatic aberration in an especially excellent manner.

Further, when a curvature radius of a magnification-side surface of the most-magnification-side lens in fourth lens group G4, namely tenth lens L10, is R4f, and a curvature radius of a reduction-side surface of the most-magnification-side lens in fourth lens group G4 is R4r, the zoom lens for projection according to the embodiment of the present invention satisfies the aforementioned conditional formula:

$$2.5<(R4f+R4r)/(R4f-R4r)<7.0 \quad (4).$$

Further, in the range defined by the aforementioned conditional formula (4), especially the following conditional formula (4') is also satisfied:

$$3.5<(R4f+R4r)/(R4f-R4r)<6.5 \quad (4').$$

Therefore, in the zoom lens for projection according to the embodiment of the present invention, it is possible to excellently correct a spherical aberration and astigmatism.

These features are similar also in Examples 2 through 6. Particularly, in Example 5, a biconvex lens L10a and a biconcave lens L10b cemented together are arranged, as the aforementioned "lens unit", on the most magnification side of fourth lens group G4. Therefore, in this case, the reduction-side surface is the reduction-side surface of biconcave lens L10b.

Further, when a focal length of an entire system at a wide angle end is fw, and a focal length of fifth lens group G5 is f5, the zoom lens for projection according to the embodiment of the present invention satisfies the aforementioned conditional formula:

$$3.0<f5/fw<7.0 \quad (5).$$

Further, in the range defined by the aforementioned conditional formula (5), especially the following conditional formula (5') is also satisfied:

$$3.5<f5/fw<6.0 \quad (5').$$

Therefore, in the zoom lens for projection according to the embodiment of the present invention, it is possible to excellently correct a lateral chromatic aberration, and to secure excellent telecentricity.

Further, when a focal length of an entire system at a wide angle end is fw, and a back focus of the entire system (a distance in air) is Bf, the zoom lens for projection according to the embodiment of the present invention satisfies the aforementioned conditional formula:

$$1.5<Bf/fw<3.0 \quad (6).$$

Further, in the range defined by the aforementioned conditional formula (6), especially the following conditional formula (6') is also satisfied:

$$1.7<Bf/fw<2.5 \quad (6').$$

Therefore, in the zoom lens for projection according to the embodiment of the present invention, it is possible to easily insert the glass block 2, such as a prism, to be arranged on the rear side (reduction side) of the zoom lens. Further, it is possible to achieve an effect of suppressing the total lens length so that the length is short.

Further, when a full angle of view at a wide angle end is 2ω, the zoom lens for projection according to the embodiment of the present invention satisfies the aforementioned conditional formula:

$$70°≤2ω \quad (7).$$

Therefore, in the zoom lens for projection according to the embodiment of the present invention, it is possible to sufficiently satisfy a need for a wider angle of view, which is required recently in a zoom lens for projection.

In the zoom lens for projection according to the embodiment of the present invention, each of all lens surfaces may be spherical, and the zoom lens may be structured without using any aspherical surface, as in the example illustrated in FIG. 1. Such a structure is cost-advantageous. Alternatively, the zoom lens for projection according to the embodiment of the present invention may use an aspherical surface. In such a case, it is possible to more excellently correct aberrations.

It is desirable that the zoom lens for projection, which is an aim of the present invention, has an F-number of 3.0 or less through the entire variable magnification range. Further, in the zoom lens for projection, which is an aim of the present invention, it is desirable that distortion (distortion aberration) is suppressed to about 2% or less through the entire variable magnification range.

Figure 14:
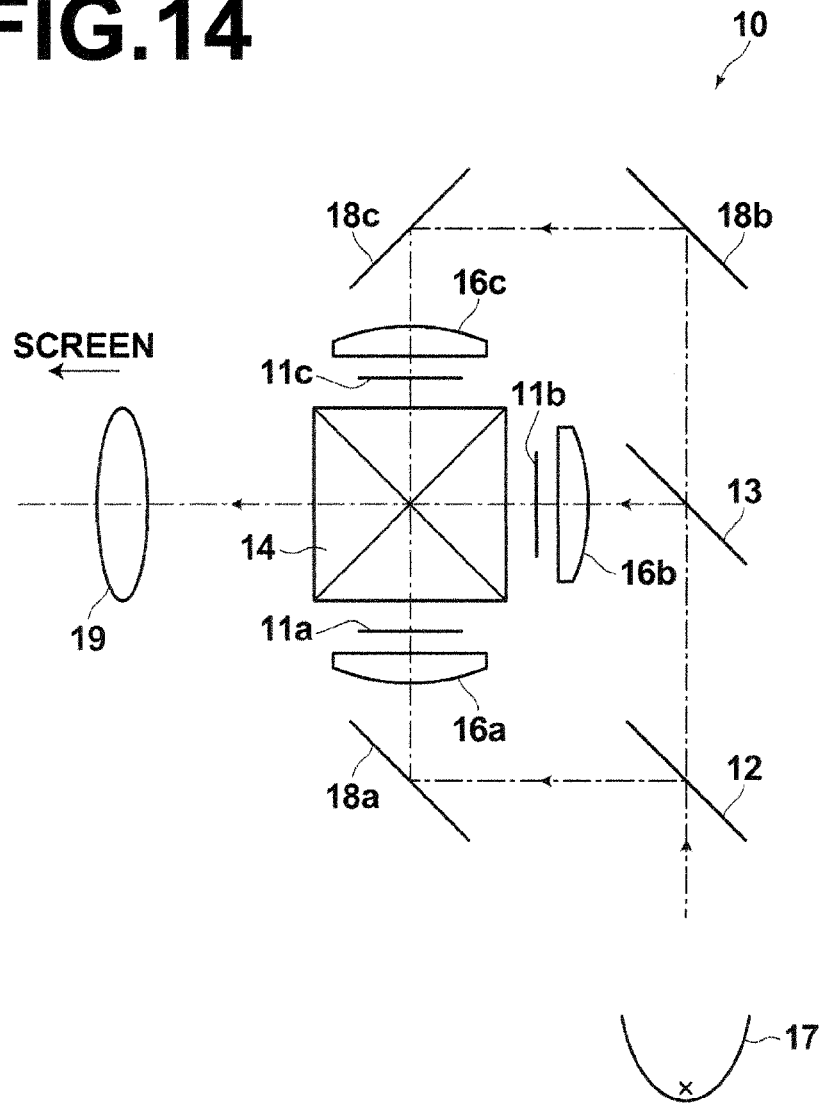
FIG. 14 is a schematic diagram illustrating the configuration of a projection-type display apparatus according to an embodiment of the present invention.
Figure 15:
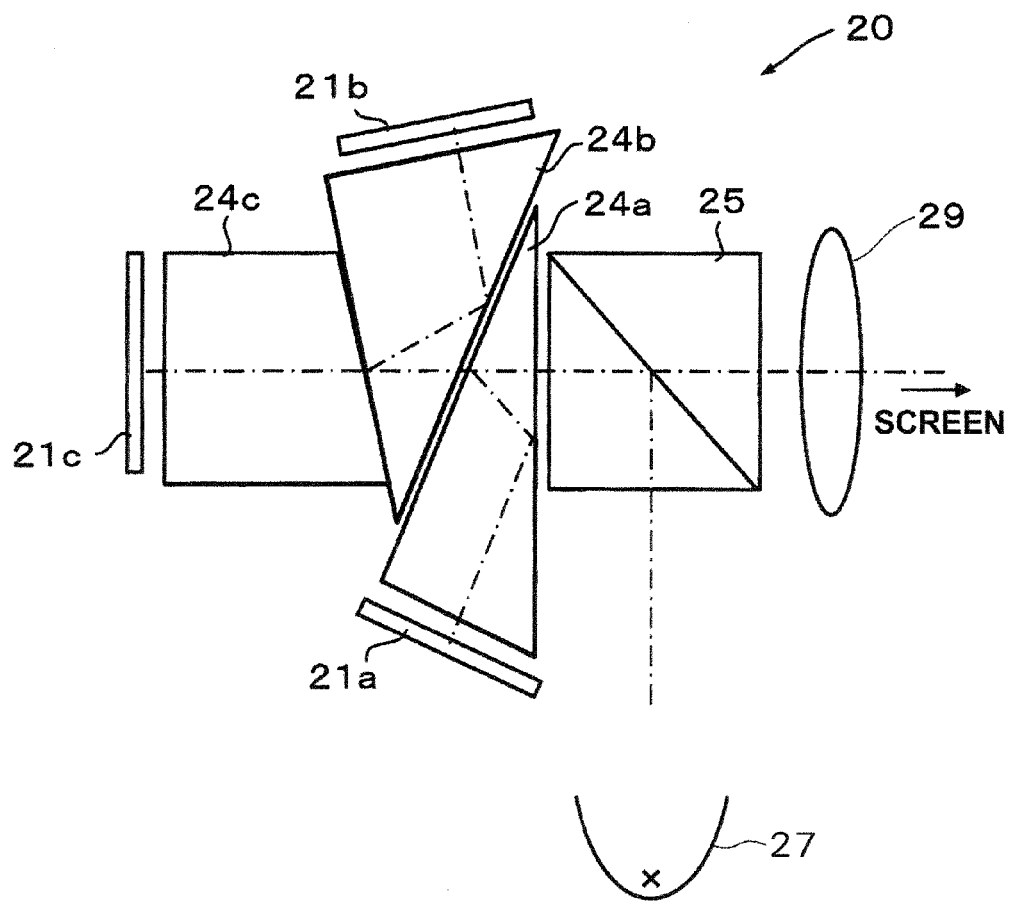
FIG. 15 is a schematic diagram illustrating the configuration of a projection-type display apparatus according to another embodiment of the present invention.

Next, embodiments of a projection-type display apparatus according to the present invention will be described with reference to FIG. 14 and FIG. 15. FIG. 14 is a schematic diagram illustrating the configuration of a part of a projection-type display apparatus according to an embodiment of the present invention. FIG. 15 is a schematic diagram illustrating the configuration of a part of a projection-type display apparatus according to another embodiment of the present invention.

The projection-type display apparatus illustrated in FIG. 14 includes an illumination optical system (illumination optical unit) 10 with a light modulation function and the zoom lens 19 for projection according to the aforementioned embodiment. The illumination optical system 10 includes transmission-type liquid crystal panels 11a, 11b and 11c, which are light valves, dichroic mirrors 12 and 13 for color separation, a cross-dichroic prism 14, as a ray combination optical system for combining rays that have passed through the transmission-type liquid crystal panels 11a through 11c, condenser lenses 16a, 16b and 16c, a light source 17 for outputting white light rays, and mirrors 18a, 18b and 18c. In FIG. 14, a fly-eye integrator or the like arranged between the light source 17 and the dichroic mirror 12 is not illustrated.

In the aforementioned structure, white light rays output from the light source 17 are separated into rays of three kinds of color (G light, B light and R light) by the dichroic mirrors 12 and 13. The separated rays enter liquid crystal panels 11a through 11c corresponding to the colors.

In each liquid crystal panel 11a through 11c, light modulation is performed on the rays of each color that have entered the liquid crystal panels 11a through 11c based on image signals of respective colors. Color combination is performed on the modulated rays of each color by the cross-dichroic prism 14. After then, the rays are projected onto a screen, which is not illustrated, by the zoom lens 19 for projection. Accordingly, a full color image by the rays of each color is projected and displayed on the screen.

Here, the light valves are not limited to the aforementioned transmission-type liquid crystal display panels 11a through 11c. Alternatively, reflection-type liquid crystal display panels, or a light modulation means, such as a DMD, may be appropriately adopted.

Meanwhile, the projection-type display apparatus according to another embodiment illustrated in FIG. 15 includes an illumination optical system 20 including reflection-type display devices 21a through 21c, as light valves corresponding to light of respective colors, TIR (Total Internal Reflection) prisms 24a through 24c for color separation and color combination and a polarized light separation prism 25, and the zoom lens 29 for projection according to the aforementioned embodiment. Further, a light source 27 is arranged before the polarized light separation prism 25. The light source 27 outputs rays to be modulated by the reflection-type display devices 21a through 21c based on image signals of respective colors.

The white light rays output from the light source 27 travel through the polarized light separation prism 25. After then, the rays are separated into rays of light of three colors (G light, B light and R light) by the TIR prisms 24a through 24c. The separated rays of light of each color enter the reflection-type display devices 21a through 21c corresponding to the colors, and light modulation is performed on the rays. Then, the rays travel again through the TIR prisms 24a through 24c in reverse directions, and colors are combined. After then, the rays are transmitted through the polarized light separation prism 25, and enter the zoom lens 29 for projection. Then, an optical image by the incident light is projected and displayed on a screen, which is not illustrated, by the zoom lens 29 for projection.

As the reflection-type display devices 21a through 21c, for example, a reflection-type liquid crystal display device, a DMD or the like may be used. FIG. 15 illustrates an example in which reflection-type display devices are used as light valves. However, light valves provided in the projection-type display apparatus of the present invention are not limited to the reflection-type display devices. Transmission-type display devices, such as transmission-type liquid crystal display devices, may be used.

Next, specific examples of the zoom lens for projection of the present invention will be described. In all of Examples 1 through 6, which will be described next, the zoom lens for projection is a five-group zoom lens.

Example 1

FIG. 1 illustrates arrangement of lens groups of the zoom lens for projection in Example 1 at a wide angle end and at a telephoto end. Since FIG. 1 has been described in detail already, explanations will not be repeated unless particularly necessary.

The zoom lens for projection in Example 1 is a five-group zoom lens in which first lens group G1 having negative refractive power, second lens group G2 having positive refractive power, third lens group G3 having positive refractive power, fourth lens group G4 having positive refractive power, and fifth lens group G5 having positive refractive power are arranged in this order from a magnification side. Further, the zoom lens for projection is configured to be telecentric on a reduction side. An image display surface 1 of a light valve, composed of a transmission-type liquid crystal display panel or the like, and a glass block 2, such as a color combination prism (including a filter, such as an infrared-ray-cut filter and a low-pass filter), are arranged on the reduction side of fifth lens group G5.

The zoom lens is configured in such a manner that first lens group G1 and fifth lens group G5 are fixed while second lens group G2, third lens group G3 and fourth lens group G4 move when magnification is changed. In FIG. 1, paths of movement of moving lens groups G2, G3 and G4 when they move from a wide angle end to a telephoto end are schematically illustrated by arrows.

First lens group G1 consists of first lens L1, which is a positive meniscus lens with a convex surface facing a magnification side, second lens L2, which is a negative meniscus lens with a concave surface facing a reduction side, third lens L3, which is a negative meniscus lens with a concave surface facing the reduction side, fourth lens L4, which is a biconcave lens, fifth lens L5, which is a negative meniscus lens with a concave surface facing the magnification side, and sixth lens L6, which is a positive meniscus lens with a convex surface facing the reduction side, which are arranged in this order from the magnification side.

Second lens group G2 consists of seventh lens L7, which is a plano-convex lens with a convex surface facing the reduction side, and eighth lens L8, which is a positive meniscus lens with a convex surface facing the magnification side, which are arranged in this order from the magnification side. Third lens group G3 consists of ninth lens L9, which is a biconvex lens.

Fourth lens group G4 consists of tenth lens L10, which is a negative meniscus lens with a concave surface facing the reduction side, 11th lens L11, which is a biconvex lens, 12th lens L12, which is a biconcave lens, 13th lens L13, which is a biconvex lens, and 14th lens L14, which is a biconvex lens, which are arranged in this order from the magnification side. Here, 12th lens L12 and 13th lens L13 are cemented together. Further, fifth lens group G5 consists of 15th lens L5, which is a biconvex lens.

In the zoom lens for projection of Example 1, all of the lenses except 12th lens L12 and 13th lens L13 are single lenses, which are not cemented together. Further, all of the lens surfaces are spherical, and no aspheric lens is used. Therefore, the zoom lens is cost-advantageous.

FIG. 13 illustrates the path of rays of the zoom lens for projection of Example 1 at a wide angle end and at a telephoto end.

Table 1 shows basic lens data of the zoom lens for projection in Example 1. Table 1 shows data including the glass block 2. In Table 1, column Si shows the surface number of the i-th surface (i=1, 2, 3, ...) when the magnification-side surface of the most magnification-side composition element is the first surface, and surface numbers sequentially increase toward the reduction side. Column Ri shows the curvature radius of the i-th surface, and column Di shows a distance between the i-th surface and the (i+1)th surface on optical axis Z. Further, column Ndj shows the refractive index of the j-th composition element (j=1, 2, 3, ...) for d-line (wavelength is 587.6 nm). The most magnification-side composition element is the first composition element, and the number j sequentially increases toward the reduction side. The column vdj shows the Abbe number of the j-th composition element for d-line.

In Table 1, the value of curvature radius R and the value of surface distance D are normalized values by regarding the focal length of the entire system of the zoom lens for projection at a wide angle end as 1.0. Further, Table 1 shows numerical values rounded at predetermined digits. Further, the sign of a curvature radius is positive when a surface shape is convex toward the magnification side, and negative when a surface shape is convex toward the reduction side.

Among surface distances D, a distance between first lens group G1 and second lens group G2, a distance between second lens group G2 and third lens group G3, a distance between third lens group G3 and fourth lens group G4, and a distance between fourth lens group G4 and fifth lens group G5 are variable distances, which change during magnification change. In the rows corresponding to these distances, "D12", "D16", "D18", and "D27" are written by attaching the surface number of the front-side surface of each distance to the sign "D".

What has been described above is similar also in Tables 4, 7, 10, 13 and 16, which will be described later. Regarding the four variable lens-group distances, the number after the sign "D" differs depending on the number of composition elements in each example. However, the surface number of the front-side surface of each distance is attached to the sign "D" in the same manner in any of the tables.

Table 2 shows focal length f of the entire system and the values of variable distances D12, D16, D18 and D27 at a wide angle end, at a middle focal position, and at a telephoto end when magnification of the zoom lens for projection in Example 1 is changed. These numerical values are also normalized values by regarding the focal length of the entire system at a wide angle end as 1.0. Further, they are values when a projection distance is 124.569 (a similarly normalized value). Table 2 shows also F-number Fno. and full angle 2ω of view (unit is degree) of Example 1.

The description method of Table 2, which has been described above, is similar also in Tables 5, 8, 11, 14 and 17, which will be described later.

Table 3 shows values of surface distances D8 and D12 when focusing is performed on the zoom lens for projection in Example 1. Table 3 shows the values when projection distances are 62.285 and 373.708. Surface distance D8 is a distance between fourth lens L4 and fifth lens L5 in first lens group G1, and surface distance D12 is a distance between first lens group G1 and second lens group G2. Here, values at a wide angle end, at a middle focal position, and at a telephoto end are shown for the aforementioned two cases. These values of the surface distances are also normalized values by regarding the focal length of the entire system at a wide angle end as 1.0. Further, the aforementioned two projection distances are also similarly normalized values.

The description method of Table 3, which has been described above, is similar also in Tables 6, 9, 12, 15 and 18, which will be described later. However, the two kinds of projection distance are unique values in each example. Further, in Table 9 and Table 12, which illustrate Example 3 and 4 respectively, distance "D11" is written as the distance between first lens group G1 and second lens group G2, because fifth lens L5 and sixth lens L6 are cemented together.

TABLE 1

EXAMPLE 1: BASIC LENS DATA
FOCAL LENGTH f = 1.00~1.19~1.29

| Si SURFACE NUMBER | Ri CURVATURE RADIUS | Di SURFACE DISTANCE | Ndj REFRACTIVE INDEX | V dj ABBE NUMBER |
|---|---|---|---|---|
| 1 | 4.079 | 0.575 | 1.7725 | 49.60 |
| 2 | 11.070 | 0.010 | | |
| 3 | 3.187 | 0.130 | 1.7725 | 49.60 |
| 4 | 1.568 | 0.542 | | |
| 5 | 5.365 | 0.109 | 1.7725 | 49.60 |
| 6 | 1.919 | 0.522 | | |
| 7 | −4.262 | 0.088 | 1.8467 | 23.78 |
| 8 | 4.262 | 0.769 | | |
| 9 | −2.883 | 0.105 | 1.6204 | 60.29 |
| 10 | −5.244 | 0.112 | | |
| 11 | −2.949 | 0.340 | 1.5955 | 39.24 |
| 12 | −2.198 | D12 | | |
| 13 | ∞ | 0.262 | 1.8340 | 37.16 |
| 14 | −5.340 | 0.010 | | |
| 15 | 4.059 | 0.263 | 1.7725 | 49.60 |
| 16 | 16.684 | D16 | | |
| 17 | 5.817 | 0.200 | 1.4875 | 70.23 |
| 18 | −6.835 | D18 | | |
| 19 | 2.269 | 0.200 | 1.5317 | 48.84 |
| 20 | 1.471 | 0.157 | | |
| 21 | 17.174 | 0.194 | 1.4875 | 70.23 |
| 22 | −2.725 | 0.102 | | |
| 23 | −1.348 | 0.067 | 1.8061 | 33.27 |
| 24 | 2.667 | 0.389 | 1.4970 | 81.54 |
| 25 | −2.048 | 0.195 | | |
| 26 | 7.636 | 0.526 | 1.4875 | 70.23 |
| 27 | −1.800 | D27 | | |
| 28 | 4.437 | 0.347 | 1.5168 | 64.20 |
| 29 | −6.015 | 0.987 | | |
| 30 | ∞ | 1.559 | 1.5168 | 64.20 |
| 31 | ∞ | | | |

TABLE 2

EXAMPLE 1: DATA ABOUT ZOOM PROJECTION DISTANCE 124.569

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.39 | 2.57 |
| 2ω | 77.8 | 68.2 | 63.6 |
| D12 | 0.798 | 0.365 | 0.211 |
| D16 | 2.967 | 2.346 | 2.008 |
| D18 | 0.375 | 1.175 | 1.546 |
| D27 | 0.026 | 0.279 | 0.399 |

TABLE 3

EXAMPLE 1: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 62.285 | D8 | 0.864 | 0.864 | 0.864 |
|  | D12 | 0.703 | 0.270 | 0.117 |
| 373.708 | D8 | 0.704 | 0.704 | 0.704 |
|  | D12 | 0.863 | 0.430 | 0.276 |

Here, Table 19 shows values of conditions defined by conditional formulas (1) through (7) (in other words, parts of the formulas represented by letters), and values of conditions, as prerequisites for calculation of such values, for each of Examples 1 through 6. As Table 19 shows, the zoom lens for projection in Example 1 satisfies the aforementioned conditional formula (1) and also the aforementioned conditional formula (1'). Therefore, it is possible to excellently correct curvature of field (especially curvature of a sagittal image plane) through an entire variable magnification range. What has been described above is similar also in Examples 2 through 6, which will be described later in detail.

Further, as Table 19 shows, the zoom lens for projection in Example 1 satisfies the aforementioned conditional formula (2) and also the aforementioned conditional formula (2'). Therefore, it is possible to excellently correct a lateral chromatic aberration. What has been described above is similar also in Examples 2 through 6, which will be described later in detail.

Further, as Table 19 shows, the zoom lens for projection in Example 1 satisfies the aforementioned conditional formula (3) and also the aforementioned conditional formula (3'). Therefore, it is possible to excellently correct a lateral chromatic aberration. What has been described above is similar also in Examples 2 through 6, which will be described later in detail.

Further, as Table 19 shows, the zoom lens for projection in Example 1 satisfies the aforementioned conditional formula (4) and also the aforementioned conditional formula (4'). Therefore, it is possible to excellently correct a spherical aberration and astigmatism. What has been described above is similar also in Examples 2 through 6, which will be described later in detail.

Further, as Table 19 shows, the zoom lens for projection in Example 1 satisfies the aforementioned conditional formula (5) and also the aforementioned conditional formula (5'). Therefore, it is possible to excellently correct a lateral chromatic aberration, and to secure excellent telecentricity. What has been described above is similar also in Examples 2 through 6, which will be described later in detail.

Further, as Table 19 shows, the zoom lens for projection in Example 1 satisfies the aforementioned conditional formula (6) and also the aforementioned conditional formula (6'). Therefore, it is possible to easily insert a glass block 2, such as a prism, arranged on the rear side (reduction side) of the zoom lens for projection. Further, it is possible to suppress the total length of the lens so that the length is short. What has been described above is similar also in Examples 2 through 6, which will be described later in detail.

Further, as Table 19 shows, the zoom lens for projection in Example 1 satisfies the aforementioned conditional formula (7). Therefore, it is possible to sufficiently satisfy the need for a wider angle of view, which is required recently in the zoom lens for projection. What has been described above is similar also in Examples 2 through 6, which will be described later in detail.

Figure 7:
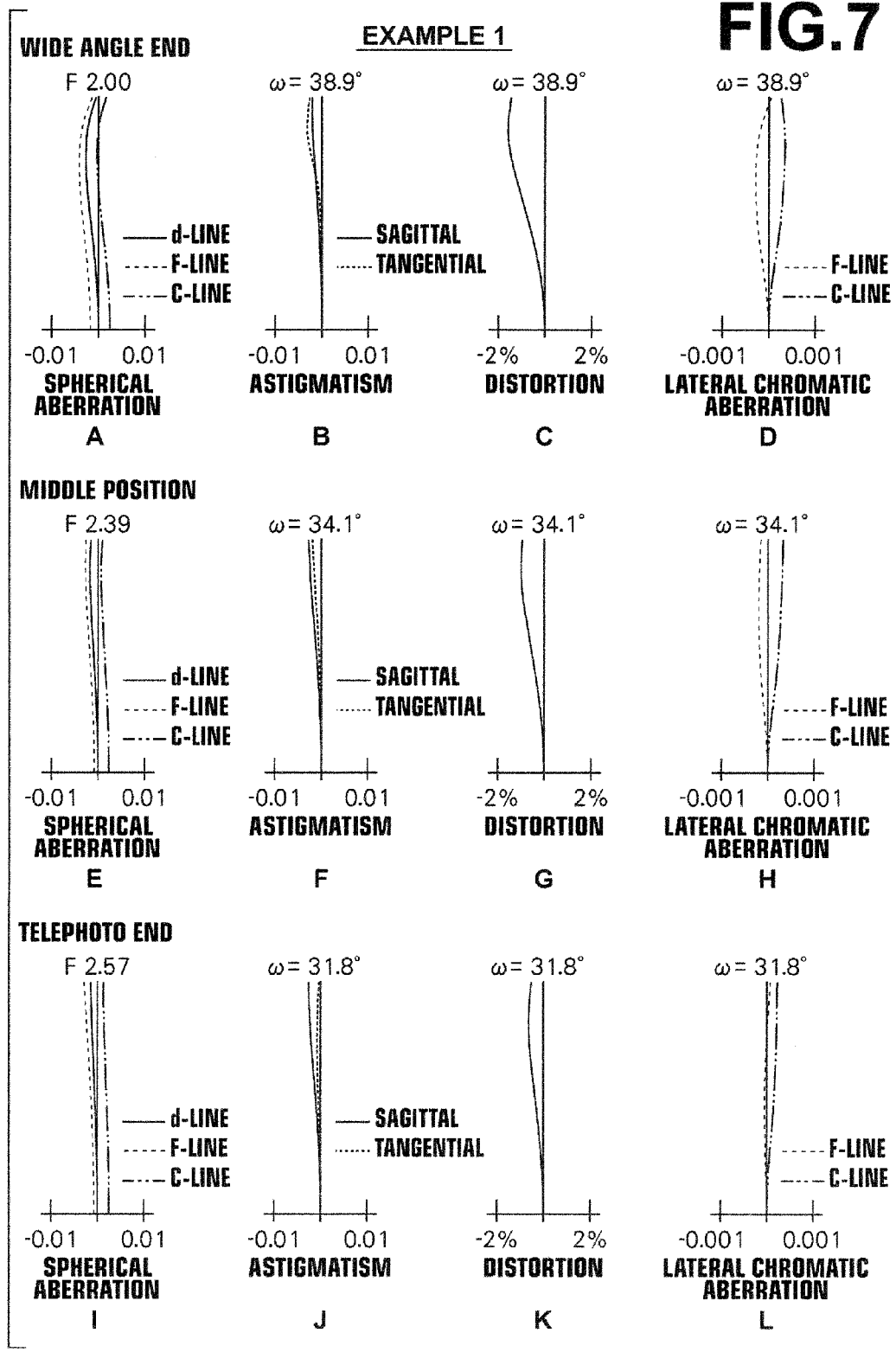
FIG. 7, Sections A through L are aberration diagrams of the zoom lens for projection in Example 1.

Here, FIG. 7, Sections A through D illustrate aberration diagrams of a spherical aberration, astigmatism, distortion (a distortion aberration), and a lateral chromatic aberration (a chromatic aberration of magnification) of the zoom lens for projection in Example 1 at a wide angle end, respectively. FIG. 7, Sections E through H illustrate aberration diagrams of a spherical aberration, astigmatism, distortion (a distortion aberration), and a lateral chromatic aberration (a chromatic aberration of magnification) of the zoom lens for projection in Example 1 at a middle focal position, respectively. FIG. 7, Sections I through L illustrate aberration diagrams of a spherical aberration, astigmatism, distortion (a distortion aberration), and a lateral chromatic aberration (a chromatic aberration of magnification) of the zoom lens for projection in Example 1 at a telephoto end, respectively.

In each of the aberration diagrams of FIG. 7, Sections A through L, d-line is used as reference. In the diagram of a spherical aberration, an aberration for F-line (wavelength is 486.1 nm) and an aberration for C-line (wavelength is 656.3 nm) are also illustrated. In the diagram of a lateral chromatic aberration, an aberration for F-line and an aberration for C-line are illustrated. In the diagram of astigmatism, an aberration for a sagittal direction and an aberration for a tangential direction are illustrated by a solid line and a broken line, respectively. In the diagram of a spherical aberration, the sign "F" illustrated at an upper part of the vertical axis means an F-number. In the other diagrams, ω illustrated at an upper part of the vertical axis means a half angle of view.

The signs used in the diagram illustrating arrangement of lens groups, the tables and the aberration diagrams in Example 1, and their meanings, and the description method are basically similar also in Examples 2 through 6, unless otherwise mentioned. Further, the feature that the diagram illustrating arrangement of lens groups in Example 1 (FIG. 1) shows arrangement at a wide angle end and arrangement at a telephoto end, and the feature that the aberration diagrams illustrate aberrations at a wide angle end, at a middle focal position and at a telephoto end, as described above, are also similar in Examples 2 through 6.

Example 2

Figure 2:
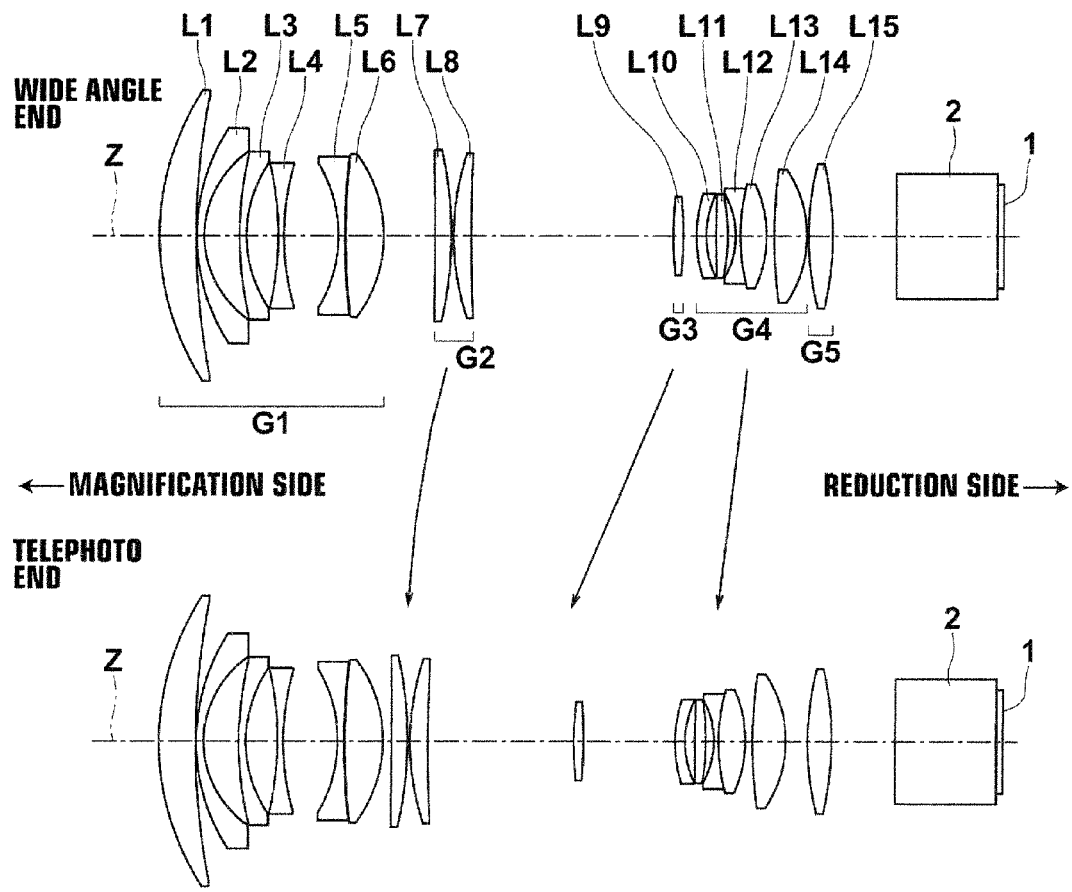
FIG. 2 is a cross section illustrating the lens structure of a zoom lens for projection in Example 2 of the present invention.

FIG. 2 illustrates arrangement of lens groups of the zoom lens for projection in Example 2 at a wide angle end and at a telephoto end. The zoom lens for projection in Example 2 is configured substantially in a similar manner to the zoom lens for projection in Example 1, which has been described already. However, the zoom lens for projection in Example 2 differs in that fifth lens L5 in first lens group G1 is a biconcave lens, and that sixth lens L6 in first lens group G1 is a biconvex lens, and that seventh lens L7 in second lens group G2 is a positive meniscus lens with a convex surface facing the reduction side.

Table 4 shows basic lens data of the zoom lens for projection in Example 2. Table 5 shows focal length f of the entire system and the values of variable distances D12, D16, D18 and D27 at a wide angle end, at a middle focal position, and at a telephoto end when magnification of the zoom lens for projection in Example 2 is changed. These numerical values are values when a projection distance is 124.553. Table 5 shows also F-number Fno. and full angle 2ω of view of the zoom lens for projection in Example 2.

Table 6 shows values of surface distances D8 and D12 when focusing is performed on the zoom lens for projection in Example 2. Table 6 shows values when projection distances are 62.277 and 373.660.

TABLE 6

EXAMPLE 2: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 62.277 | D8 | 0.910 | 0.910 | 0.910 |
|  | D12 | 0.716 | 0.233 | 0.056 |
| 373.660 | D8 | 0.778 | 0.778 | 0.778 |
|  | D12 | 0.848 | 0.365 | 0.188 |

Figure 8:
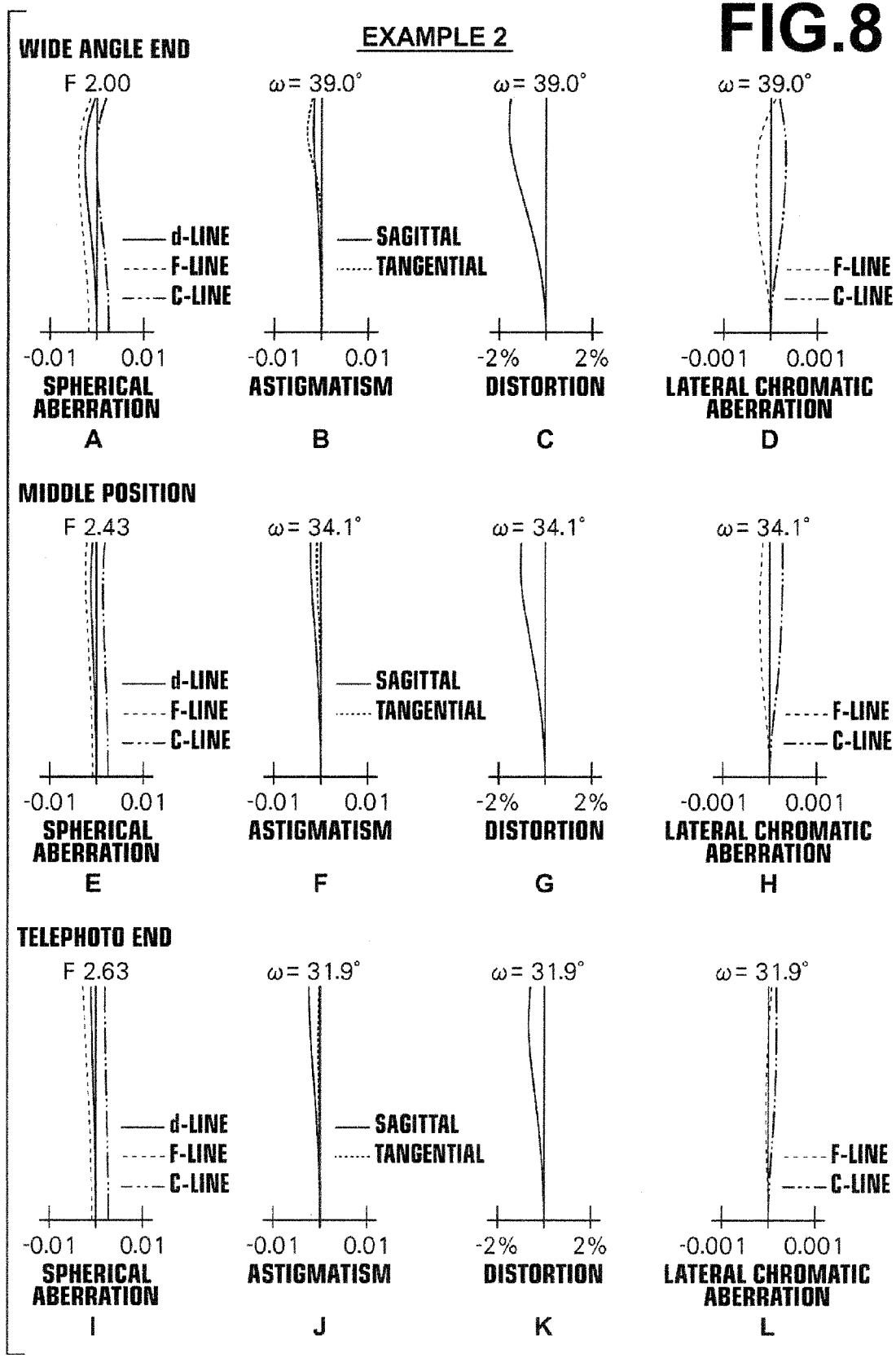
FIG. 8, Sections A through L are aberration diagrams of the zoom lens for projection in Example 2.

Meanwhile, FIG. 8, Sections A through L illustrate aberration diagrams of the zoom lens for projection in Example 2.

TABLE 4

EXAMPLE 2: BASIC LENS DATA

FOCAL LENGTH  f = 1.0~1.19~1.29

| Si SURFACE NUMBER | Ri CURVATURE RADIUS | Di SURFACE DISTANCE | Ndj REFRACTIVE INDEX | ν dj ABBE NUMBER |
|---|---|---|---|---|
| 1 | 4.110 | 0.568 | 1.7725 | 49.60 |
| 2 | 11.255 | 0.010 |  |  |
| 3 | 3.081 | 0.114 | 1.7725 | 49.60 |
| 4 | 1.579 | 0.545 |  |  |
| 5 | 5.425 | 0.109 | 1.7725 | 49.60 |
| 6 | 2.008 | 0.494 |  |  |
| 7 | −4.671 | 0.088 | 1.8467 | 23.78 |
| 8 | 3.970 | 0.832 |  |  |
| 9 | −2.204 | 0.099 | 1.6180 | 63.33 |
| 10 | 11.273 | 0.010 |  |  |
| 11 | 10.929 | 0.586 | 1.5182 | 58.90 |
| 12 | −2.123 | D12 |  |  |
| 13 | −87.319 | 0.248 | 1.8340 | 37.16 |
| 14 | −5.951 | 0.038 |  |  |
| 15 | 4.070 | 0.274 | 1.7880 | 47.37 |
| 16 | 28.959 | D16 |  |  |
| 17 | 6.234 | 0.149 | 1.4875 | 70.23 |
| 18 | −7.312 | D18 |  |  |
| 19 | 2.266 | 0.152 | 1.5955 | 39.24 |
| 20 | 1.495 | 0.150 |  |  |
| 21 | 18.187 | 0.174 | 1.5163 | 64.14 |
| 22 | −3.469 | 0.121 |  |  |
| 23 | −1.319 | 0.070 | 1.8061 | 33.27 |
| 24 | 3.119 | 0.406 | 1.4970 | 81.54 |
| 25 | −1.920 | 0.115 |  |  |
| 26 | 7.715 | 0.505 | 1.4875 | 70.23 |
| 27 | −1.850 | D27 |  |  |
| 28 | 4.552 | 0.374 | 1.5163 | 64.14 |
| 29 | −4.927 | 0.987 |  |  |
| 30 | ∞ | 1.558 | 1.5168 | 64.20 |
| 31 | ∞ |  |  |  |

TABLE 5

EXAMPLE 2: DATA ABOUT ZOOM
PROJECTION DISTANCE 124.553

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.43 | 2.63 |
| 2ω | 78.0 | 68.2 | 63.8 |
| D12 | 0.794 | 0.311 | 0.134 |
| D16 | 3.124 | 2.566 | 2.253 |
| D18 | 0.204 | 1.027 | 1.425 |
| D27 | 0.026 | 0.244 | 0.336 |

Example 3

Figure 3:
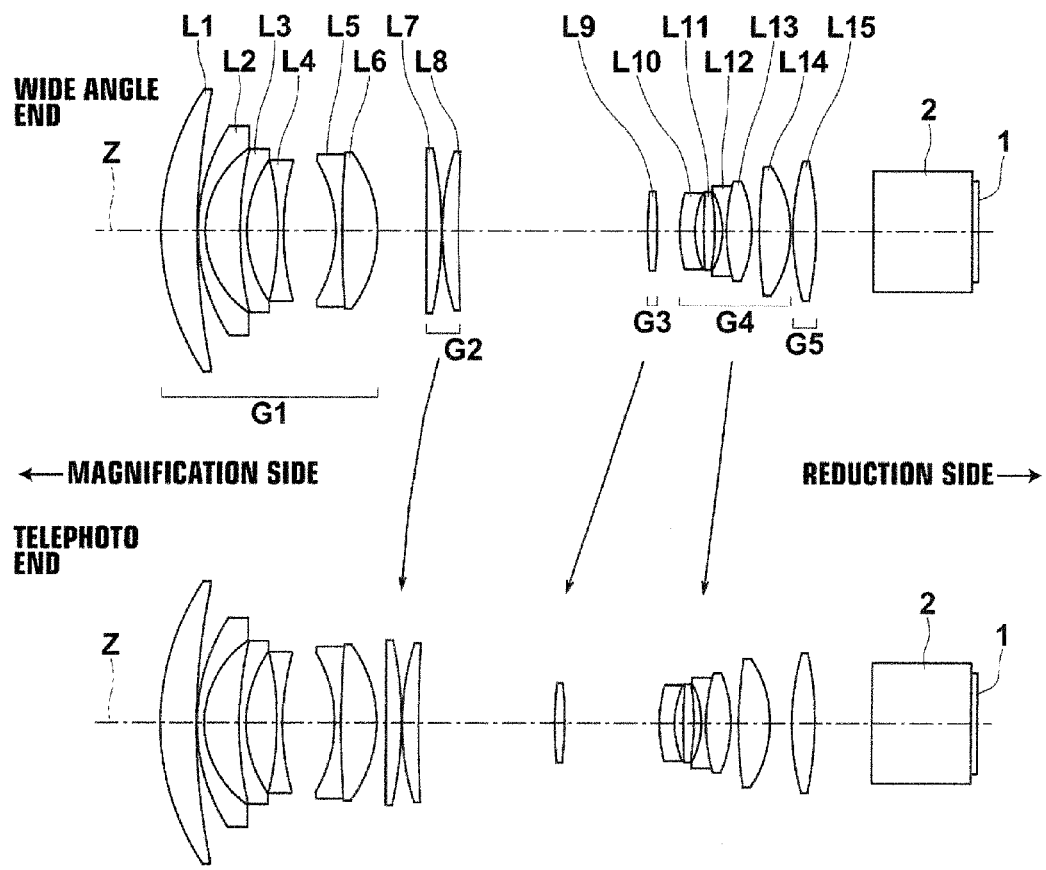
FIG. 3 is a cross section illustrating the lens structure of a zoom lens for projection in Example 3 of the present invention.

FIG. 3 illustrates arrangement of lens groups of the zoom lens for projection in Example 3 at a wide angle end and at a telephoto end. The zoom lens for projection in Example 3 is configured substantially in a similar manner to the zoom lens for projection in Example 1, which has been described already. However, the zoom lens for projection in Example 3 differs in that fifth lens L5 in first lens group G1 is a biconcave lens, and that sixth lens L6 in first lens group G1 is a biconvex lens, and that seventh lens L7 in second lens group G2 is a positive meniscus lens with a convex surface facing the reduction side, and that fifth lens L5 and sixth lens L6 are cemented together.

Table 7 shows basic lens data of the zoom lens for projection in Example 3. Table 8 shows focal length f of the entire system and the values of variable distances D11, D15, D17 and D26 at a wide angle end, at a middle focal position, and at a telephoto end when magnification of the zoom lens for projection in Example 3 is changed. These numerical values are values when a projection distance is 124.547. Table 8 shows also F-number Fno. and full angle 2ω of view of the zoom lens for projection in Example 3.

Table 9 shows values of surface distances D8 and D11 when focusing is performed on the zoom lens for projection in Example 3. Table 9 shows values when projection distances are 62.274 and 373.642.

TABLE 7

EXAMPLE 3: BASIC LENS DATA

| Si SURFACE NUMBER | Ri CURVATURE RADIUS | FOCAL LENGTH Di SURFACE DISTANCE | f = 1.00~1.19~1.29 Ndj REFRACTIVE INDEX | νdj ABBE NUMBER |
|---|---|---|---|---|
| 1 | 4.050 | 0.574 | 1.7725 | 49.60 |
| 2 | 10.945 | 0.010 | | |
| 3 | 3.066 | 0.114 | 1.7725 | 49.60 |
| 4 | 1.576 | 0.551 | | |
| 5 | 5.620 | 0.109 | 1.7725 | 49.60 |
| 6 | 1.974 | 0.495 | | |
| 7 | −4.737 | 0.088 | 1.8467 | 23.78 |
| 8 | 4.142 | 0.823 | | |
| 9 | −2.202 | 0.099 | 1.6385 | 55.38 |
| 10 | 15.570 | 0.565 | 1.5174 | 52.43 |
| 11 | −2.089 | D11 | | |
| 12 | −347.233 | 0.241 | 1.8340 | 37.16 |
| 13 | −6.021 | 0.010 | | |
| 14 | 4.294 | 0.261 | 1.8040 | 46.57 |
| 15 | 27.882 | D15 | | |
| 16 | 6.224 | 0.155 | 1.4970 | 81.54 |
| 17 | −6.651 | D17 | | |
| 18 | 2.441 | 0.242 | 1.5955 | 39.24 |
| 19 | 1.526 | 0.141 | | |
| 20 | 17.730 | 0.165 | 1.5891 | 61.14 |
| 21 | −3.879 | 0.120 | | |
| 22 | −1.335 | 0.070 | 1.8061 | 33.27 |
| 23 | 2.911 | 0.396 | 1.4970 | 81.54 |
| 24 | −1.953 | 0.120 | | |
| 25 | 7.353 | 0.498 | 1.4875 | 70.23 |
| 26 | −1.829 | D26 | | |
| 27 | 4.182 | 0.372 | 1.5163 | 64.14 |
| 28 | −5.187 | 0.909 | | |
| 29 | ∞ | 1.558 | 1.5168 | 64.20 |
| 30 | ∞ | | | |

TABLE 8

EXAMPLE 3: DATA ABOUT ZOOM PROJECTION DISTANCE 124.547

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.38 | 2.56 |
| 2ω | 78.0 | 68.0 | 63.6 |
| D11 | 0.779 | 0.324 | 0.158 |
| D15 | 2.986 | 2.453 | 2.154 |
| D17 | 0.356 | 1.132 | 1.507 |
| D26 | 0.039 | 0.252 | 0.342 |

TABLE 9

EXAMPLE 3: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 62.274 | D8 | 0.928 | 0.928 | 0.928 |
| | D11 | 0.675 | 0.219 | 0.053 |
| 373.642 | D8 | 0.752 | 0.752 | 0.752 |
| | D11 | 0.850 | 0.394 | 0.228 |

Figure 9:
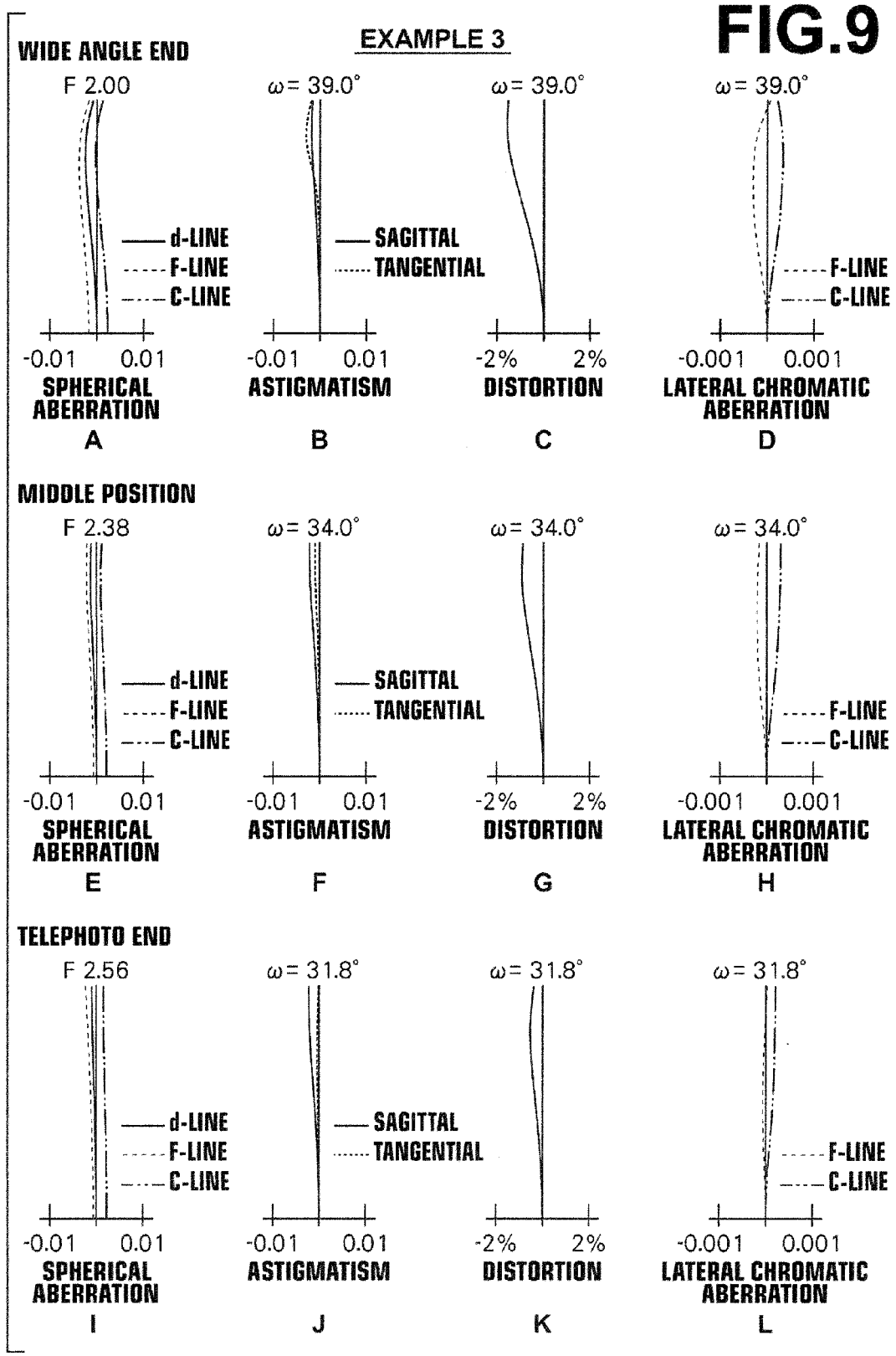
FIG. 9, Sections A through L are aberration diagrams of the zoom lens for projection in Example 3.

Meanwhile, FIG. 9, Sections A through L illustrate aberration diagrams of the zoom lens for projection in Example 3.

Example 4

Figure 4:
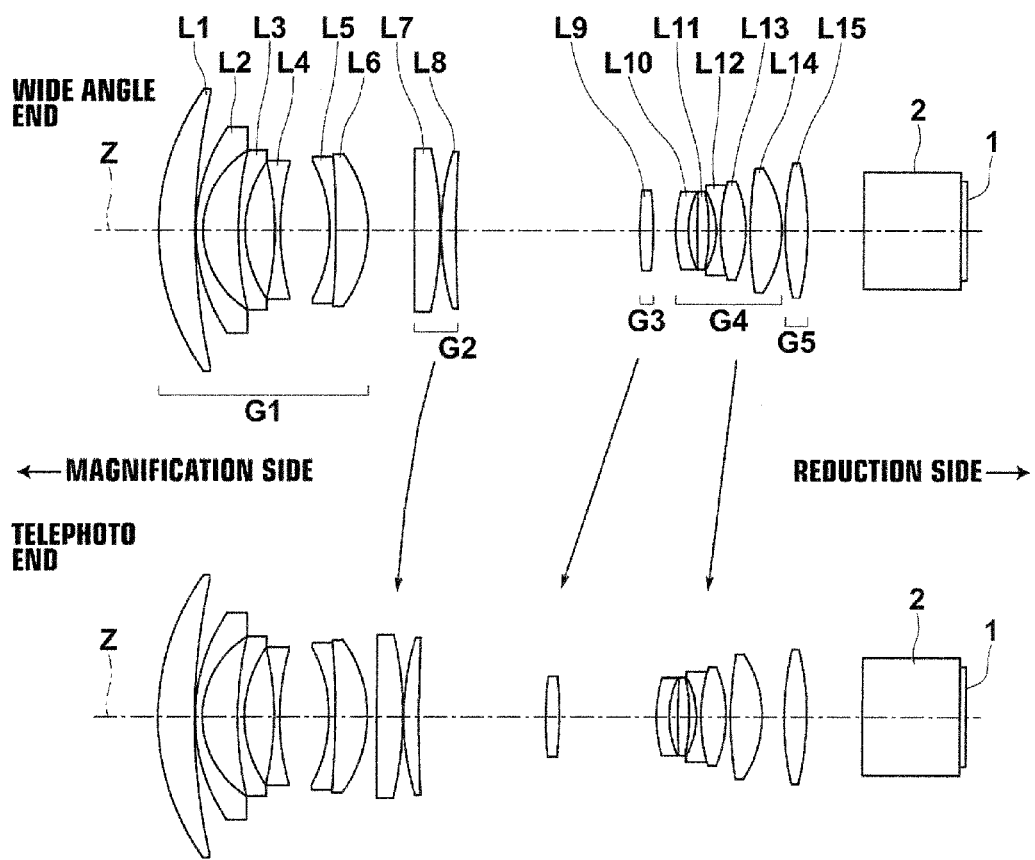
FIG. 4 is a cross section illustrating the lens structure of a zoom lens for projection in Example 4 of the present invention.

FIG. 4 illustrates arrangement of lens groups of the zoom lens for projection in Example 4 at a wide angle end and at a telephoto end. The zoom lens for projection in Example 4 is configured substantially in a similar manner to the zoom lens for projection in Example 1, which has been described already. However, the zoom lens for projection in Example 4 differs in that seventh lens L7 in second lens group G2 is a biconvex lens, and that fifth lens L5 and sixth lens L6 are cemented together.

Table 10 shows basic lens data of the zoom lens for projection in Example 4. Table 11 shows focal length f of the entire system and the values of variable distances D11, D15, D17 and D26 at a wide angle end, at a middle focal position, and at a telephoto end when magnification of the zoom lens for projection in Example 4 is changed. These numerical values are values when a projection distance is 129.727. Table 11 shows also F-number Fno. and full angle 2ω of view of the zoom lens for projection in Example 4.

Table 12 shows values of surface distances D8 and D11 when focusing is performed on the zoom lens for projection in Example 4. Table 12 shows values when projection distances are 64.864 and 389.182.

TABLE 10

EXAMPLE 4: BASIC LENS DATA

| Si SURFACE NUMBER | Ri CURVATURE RADIUS | FOCAL LENGTH Di SURFACE DISTANCE | f = 1.00~1.19~1.29 Ndj REFRACTIVE INDEX | νdj ABBE NUMBER |
|---|---|---|---|---|
| 1 | 4.065 | 0.613 | 1.7725 | 49.60 |
| 2 | 10.528 | 0.011 | | |
| 3 | 3.098 | 0.119 | 1.7880 | 47.37 |
| 4 | 1.568 | 0.589 | | |
| 5 | 5.811 | 0.113 | 1.7880 | 47.37 |
| 6 | 1.998 | 0.499 | | |
| 7 | −4.878 | 0.092 | 1.8467 | 23.78 |
| 8 | 4.105 | 0.818 | | |
| 9 | −2.457 | 0.103 | 1.7292 | 54.68 |
| 10 | −16.178 | 0.532 | 1.5174 | 52.43 |
| 11 | −2.172 | D11 | | |
| 12 | 295.047 | 0.435 | 1.8340 | 37.16 |
| 13 | −5.880 | 0.011 | | |
| 14 | 4.539 | 0.255 | 1.8040 | 46.57 |
| 15 | 27.375 | D15 | | |
| 16 | 6.830 | 0.224 | 1.4970 | 81.54 |
| 17 | −6.762 | D17 | | |
| 18 | 2.414 | 0.213 | 1.5955 | 39.24 |
| 19 | 1.541 | 0.147 | | |
| 20 | 11.336 | 0.191 | 1.5163 | 64.14 |
| 21 | −3.395 | 0.119 | | |
| 22 | −1.373 | 0.073 | 1.8010 | 34.97 |
| 23 | 2.875 | 0.418 | 1.4970 | 81.54 |

TABLE 10-continued

EXAMPLE 4: BASIC LENS DATA

| Si SURFACE NUMBER | Ri CURVATURE RADIUS | Di SURFACE DISTANCE | Ndj REFRACTIVE INDEX | νdj ABBE NUMBER |
|---|---|---|---|---|
| | FOCAL LENGTH | | f = 1.00~1.19~1.29 | |
| 24 | −2.143 | 0.073 | | |
| 25 | 6.904 | 0.524 | 1.4970 | 81.54 |
| 26 | −1.887 | D26 | | |
| 27 | 5.080 | 0.378 | 1.5163 | 64.14 |
| 28 | −4.763 | 0.931 | | |
| 29 | ∞ | 1.623 | 1.5168 | 64.20 |
| 30 | ∞ | | | |

TABLE 11

EXAMPLE 4: DATA ABOUT ZOOM PROJECTION DISTANCE 129.727

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.39 | 2.57 |
| 2ω | 80.2 | 70.2 | 65.8 |
| D11 | 0.769 | 0.321 | 0.160 |
| D15 | 3.059 | 2.449 | 2.116 |
| D17 | 0.375 | 1.222 | 1.622 |
| D26 | 0.059 | 0.268 | 0.363 |

TABLE 12

EXAMPLE 4: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 64.864 | D8 | 0.922 | 0.922 | 0.922 |
| | D11 | 0.664 | 0.217 | 0.056 |
| 389.182 | D8 | 0.747 | 0.747 | 0.747 |
| | D11 | 0.839 | 0.392 | 0.231 |

Figure 10:
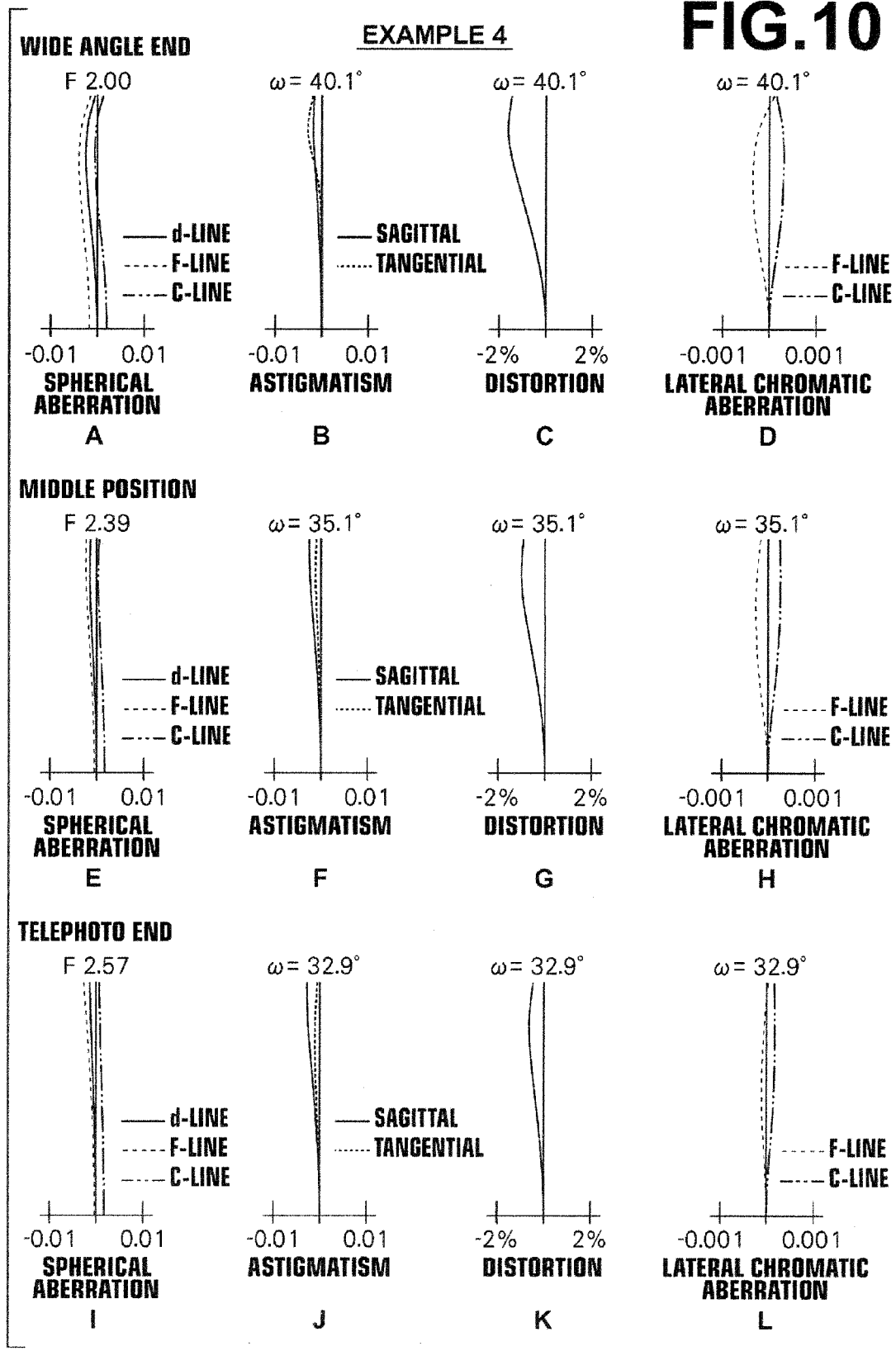
FIG. 10, Sections A through L are aberration diagrams of the zoom lens for projection in Example 4.

Meanwhile, FIG. 10, Sections A through L illustrate aberration diagrams of the zoom lens for projection in Example 4.

Example 5

Figure 5:
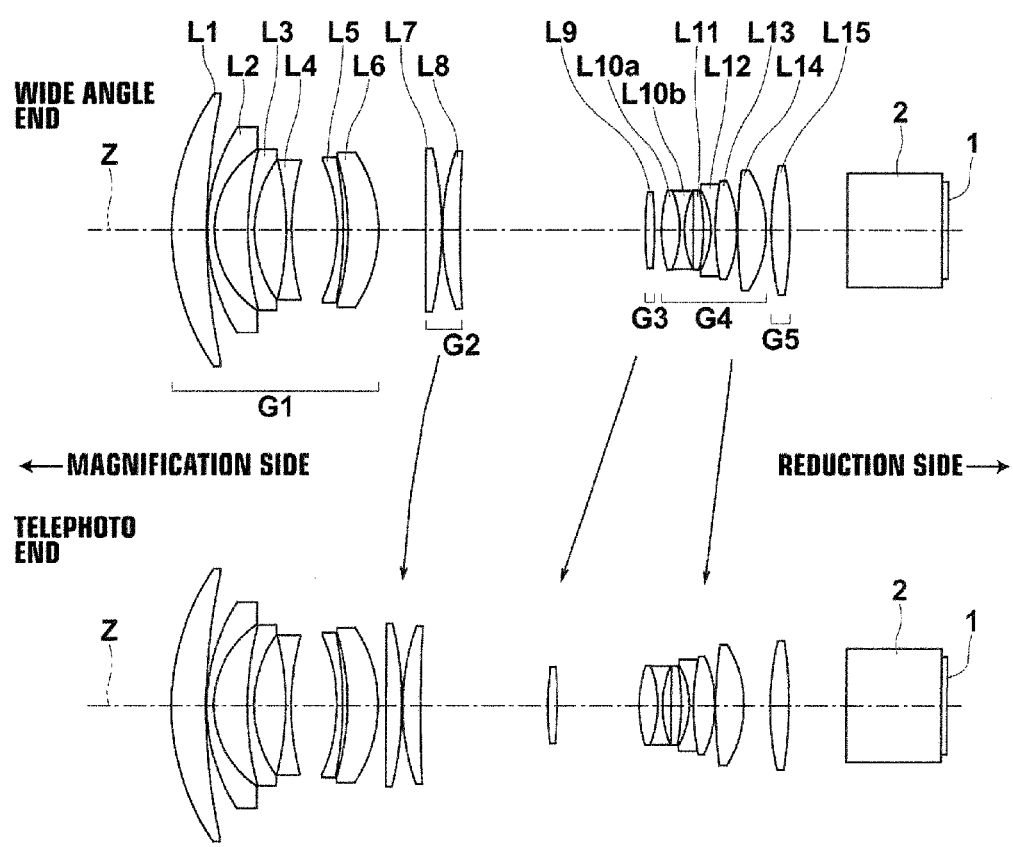
FIG. 5 is a cross section illustrating the lens structure of a zoom lens for projection in Example 5 of the present invention.

FIG. 5 illustrates arrangement of lens groups of the zoom lens for projection in Example 5 at a wide angle end and at a telephoto end. The zoom lens for projection in Example 5 is configured substantially in a similar manner to the zoom lens for projection in Example 1, which has been described already. However, the zoom lens for projection in Example 5 differs in that seventh lens L7 in second lens group G2 is a positive meniscus lens with a convex surface facing the reduction side, and that biconvex lens L10a and biconcave lens L10b cemented together are used in place of tenth lens L10 (please refer to FIG. 1) in fourth lens group G4, and that 11th lens L11 in fourth lens group G4 is a positive meniscus lens with a convex surface facing the reduction side.

Table 13 shows basic lens data of the zoom lens for projection in Example 5. Table 14 shows focal length f of the entire system and the values of variable distances D12, D16, D18 and D28 at a wide angle end, at a middle focal position, and at a telephoto end when magnification of the zoom lens for projection in Example 5 is changed. These numerical values are values when a projection distance is 122.350. Table 14 shows also F-number Fno. and full angle 2ω of view of the zoom lens for projection in Example 5.

Table 15 shows values of surface distances D8 and D12 when focusing is performed on the zoom lens for projection in Example 5. Table 15 shows values when projection distances are 61.175 and 367.049.

TABLE 13

EXAMPLE 5: BASIC LENS DATA

| Si SURFACE NUMBER | Ri CURVATURE RADIUS | Di SURFACE DISTANCE | Ndj REFRACTIVE INDEX | νdj ABBE NUMBER |
|---|---|---|---|---|
| | FOCAL LENGTH | | f = 1.00~1.19~1.29 | |
| 1 | 3.930 | 0.557 | 1.7725 | 49.60 |
| 2 | 10.295 | 0.010 | | |
| 3 | 3.090 | 0.112 | 1.7725 | 49.60 |
| 4 | 1.573 | 0.542 | | |
| 5 | 5.077 | 0.107 | 1.8040 | 46.57 |
| 6 | 1.970 | 0.512 | | |
| 7 | −4.564 | 0.087 | 1.8467 | 23.78 |
| 8 | 4.215 | 0.741 | | |
| 9 | −2.726 | 0.097 | 1.6400 | 60.08 |
| 10 | −5.966 | 0.079 | | |
| 11 | −3.921 | 0.493 | 1.5174 | 52.43 |
| 12 | −2.247 | D12 | | |
| 13 | −979.029 | 0.252 | 1.7380 | 32.26 |
| 14 | −5.717 | 0.010 | | |
| 15 | 3.855 | 0.285 | 1.7995 | 42.22 |
| 16 | 26.468 | D16 | | |
| 17 | 6.194 | 0.145 | 1.4875 | 70.23 |
| 18 | −7.921 | D18 | | |
| 19 | 2.223 | 0.297 | 1.5400 | 59.46 |
| 20 | −1.707 | 0.075 | 1.6398 | 34.46 |
| 21 | 1.567 | 0.145 | | |
| 22 | −127.302 | 0.160 | 1.6779 | 55.34 |
| 23 | −3.353 | 0.127 | | |
| 24 | −1.299 | 0.069 | 1.7995 | 42.22 |
| 25 | 3.932 | 0.351 | 1.4970 | 81.54 |
| 26 | −1.890 | 0.010 | | |
| 27 | 7.468 | 0.459 | 1.5891 | 61.14 |
| 28 | −1.832 | D28 | | |
| 29 | 4.858 | 0.300 | 1.5638 | 60.67 |
| 30 | −6.724 | 0.919 | | |
| 31 | ∞ | 1.531 | 1.5168 | 64.20 |
| 32 | ∞ | | | |

TABLE 14

EXAMPLE 5: ABOUT ZOOM PROJECTION DISTANCE 122.350

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.41 | 2.60 |
| 2ω | 76.8 | 67.0 | 62.6 |
| D12 | 0.753 | 0.295 | 0.126 |
| D16 | 2.976 | 2.384 | 2.051 |
| D18 | 0.112 | 0.936 | 1.324 |
| D28 | 0.079 | 0.305 | 0.419 |

TABLE 15

EXAMPLE 5: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 61.175 | D8 | 0.824 | 0.824 | 0.824 |
| | D12 | 0.671 | 0.213 | 0.044 |

TABLE 15-continued

EXAMPLE 5: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 367.049 | D8 | 0.684 | 0.684 | 0.684 |
|  | DI2 | 0.810 | 0.352 | 0.183 |

Figure 11:
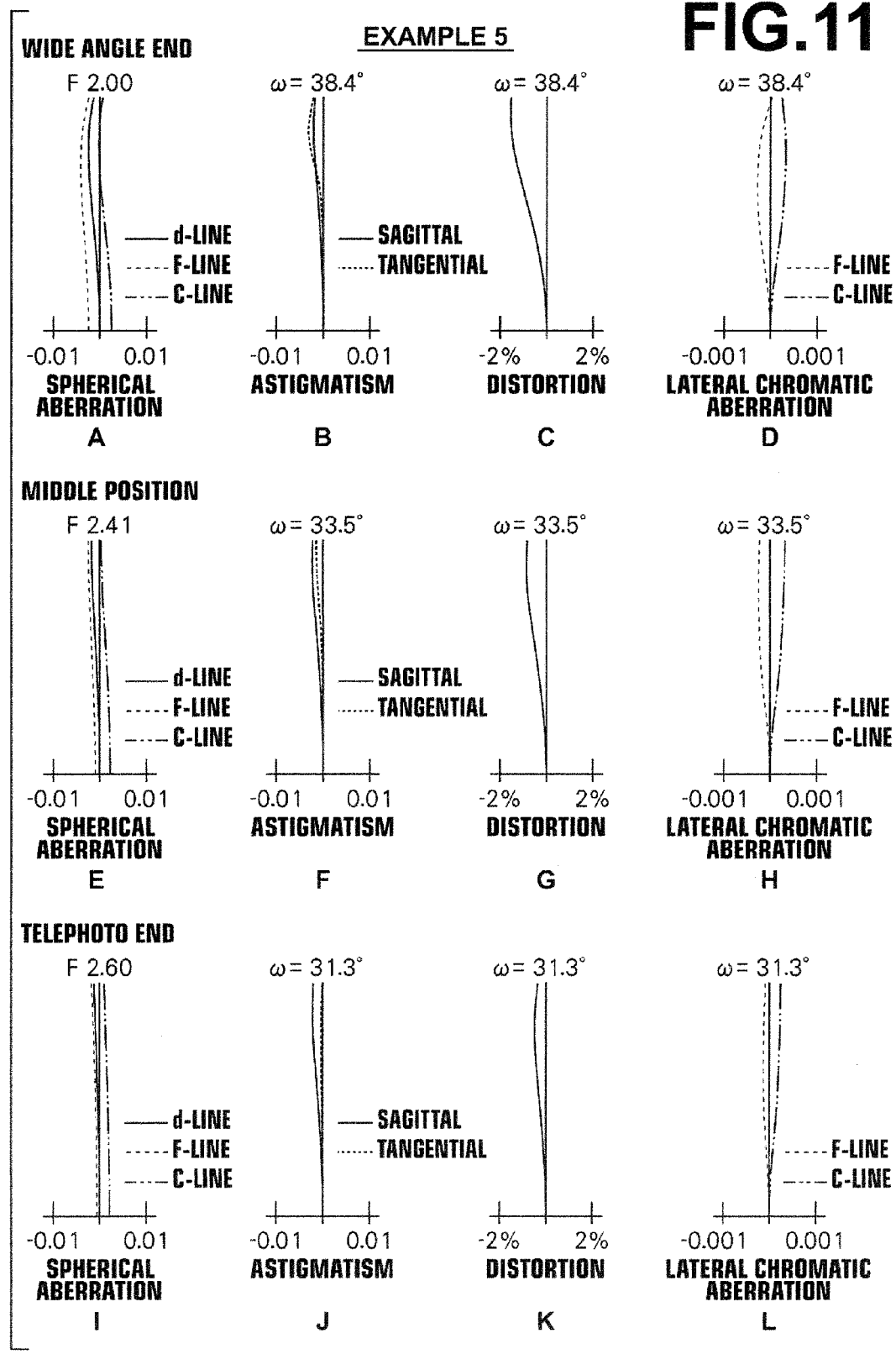
FIG. 11, Sections A through L are aberration diagrams of the zoom lens for projection in Example 5.

Meanwhile, FIG. 11, Sections A through L illustrate aberration diagrams of the zoom lens for projection in Example 5.

Example 6

Figure 6:
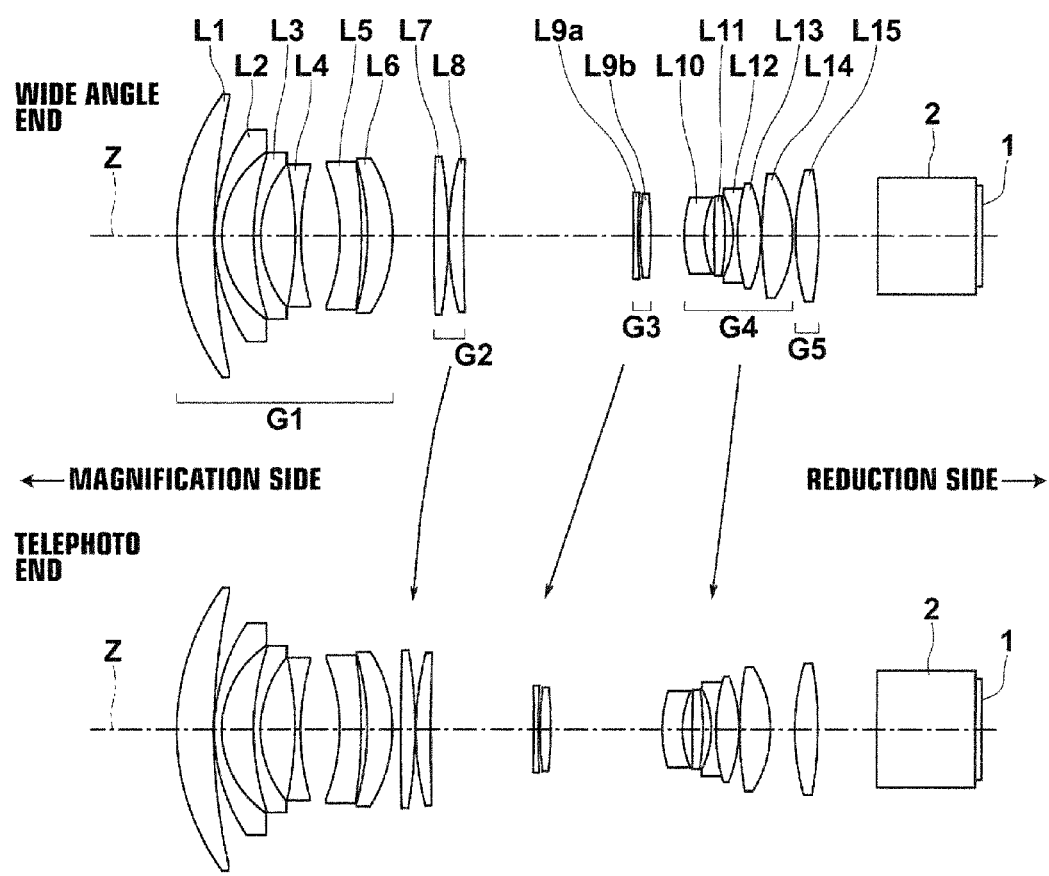
FIG. 6 is a cross section illustrating the lens structure of a zoom lens for projection in Example 6 of the present invention.

FIG. 6 illustrates arrangement of lens groups of the zoom lens for projection in Example 6 at a wide angle end and at a telephoto end. The zoom lens for projection in Example 6 is configured substantially in a similar manner to the zoom lens for projection in Example 1, which has been described already. However, the zoom lens for projection in Example 6 differs in that seventh lens L7 in second lens group G2 is a biconvex lens, and that biconcave lens L9a and biconvex lens L9b are used in place of ninth lens L9 (please refer to FIG. 1) in third lens group G3.

Table 16 shows basic lens data of the zoom lens for projection in Example 6. Table 17 shows focal length f of the entire system and the values of variable distances D12, D16, D20 and D29 at a wide angle end, at a middle focal position, and at a telephoto end when magnification of the zoom lens for projection in Example 6 is changed. These numerical values are values when a projection distance is 122.333. Table 17 shows also F-number Fno. and full angle 2ω of view of the zoom lens for projection in Example 6.

Table 18 shows values of surface distances D8 and D12 when focusing is performed on the zoom lens for projection in Example 6. Table 18 shows values when projection distances are 61.166 and 366.998.

TABLE 16

EXAMPLE 6: BASIC LENS DATA $f = 1.00 \sim 1.19 \sim 1.29$

| Si SURFACE NUMBER | Ri FOCAL LENGTH CURVATURE RADIUS | Di SURFACE DISTANCE | Ndj REFRACTIVE INDEX | νdj ABBE NUMBER |
|---|---|---|---|---|
| 1 | 3.798 | 0.572 | 1.7725 | 49.60 |
| 2 | 9.712 | 0.010 | | |
| 3 | 2.963 | 0.112 | 1.7725 | 49.60 |
| 4 | 1.580 | 0.491 | | |
| 5 | 4.051 | 0.107 | 1.7880 | 47.37 |
| 6 | 1.743 | 0.533 | | |
| 7 | −5.139 | 0.087 | 1.8467 | 23.78 |
| 8 | 3.837 | 0.610 | | |
| 9 | −2.881 | 0.338 | 1.6400 | 60.08 |
| 10 | −7.400 | 0.093 | | |

TABLE 16-continued

EXAMPLE 6: BASIC LENS DATA $f = 1.00 \sim 1.19 \sim 1.29$

| Si SURFACE NUMBER | Ri FOCAL LENGTH CURVATURE RADIUS | Di SURFACE DISTANCE | Ndj REFRACTIVE INDEX | νdj ABBE NUMBER |
|---|---|---|---|---|
| 11 | −4.021 | 0.388 | 1.5174 | 52.43 |
| 12 | −2.262 | D12 | | |
| 13 | 45.381 | 0.221 | 1.8000 | 29.84 |
| 14 | −7.206 | 0.010 | | |
| 15 | 4.682 | 0.234 | 1.7995 | 42.22 |
| 16 | 37.514 | D16 | | |
| 17 | −18.133 | 0.067 | 1.7174 | 29.52 |
| 18 | 9.238 | 0.034 | | |
| 19 | 5.246 | 0.165 | 1.7725 | 49.60 |
| 20 | −6.944 | D20 | | |
| 21 | 2.161 | 0.311 | 1.5407 | 47.23 |
| 22 | 1.489 | 0.153 | | |
| 23 | 25.255 | 0.167 | 1.5891 | 61.14 |
| 24 | −3.738 | 0.129 | | |
| 25 | −1.373 | 0.071 | 1.8010 | 34.97 |
| 26 | 2.968 | 0.363 | 1.4970 | 81.54 |
| 27 | −2.124 | 0.010 | | |
| 28 | 5.858 | 0.477 | 1.4970 | 81.54 |
| 29 | −1.832 | D29 | | |
| 30 | 3.783 | 0.360 | 1.5163 | 64.14 |
| 31 | −5.782 | 0.919 | | |
| 32 | ∞ | 1.531 | 1.5168 | 64.20 |
| 33 | ∞ | | | |

TABLE 17

EXAMPLE 6: DATA ABOUT ZOOM PROJECTION DISTANCE 122.333

| SPECIFICATION | WIDE ANGLE END | MIDDLE POSITION | TELEPHOTO END |
|---|---|---|---|
| f | 1.00 | 1.19 | 1.29 |
| Fno. | 2.00 | 2.33 | 2.48 |
| 2ω | 76.8 | 67.0 | 62.6 |
| D12 | 0.638 | 0.260 | 0.128 |
| D16 | 2.627 | 1.962 | 1.605 |
| D20 | 0.517 | 1.327 | 1.720 |
| D29 | 0.043 | 0.276 | 0.373 |

TABLE 18

EXAMPLE 6: DATA ABOUT FOCUSING

| PROJECTION DISTANCE | MOVEMENT DISTANCE | WIDE ANGLE END | MIDDLE POSITION | TELEPHOTO END |
|---|---|---|---|---|
| 61.166 | D8 | 0.694 | 0.694 | 0.694 |
|  | D12 | 0.554 | 0.175 | 0.044 |
| 366.998 | D8 | 0.552 | 0.552 | 0.552 |
|  | D12 | 0.696 | 0.318 | 0.186 |

TABLE 19

| | EXAMPLE 1 | EXAMPLE 2 | EXAMPLE 3 | EXAMPLE 4 | EXAMPLE 5 | EXAMPLE 6 |
|---|---|---|---|---|---|---|
| fw | 1.00 | 1.00 | 1.00 | 1.00 | 1.00 | 1.00 |
| f4 | 9.69 | 12.47 | 12.52 | 11.48 | 8.46 | 9.85 |
| f5 | 5.00 | 4.64 | 4.55 | 4.82 | 5.05 | 4.49 |
| Bf | 2.01 | 2.01 | 1.94 | 2.00 | 1.93 | 1.93 |
| (1) f4/fw | 9.69 | 12.47 | 12.52 | 11.48 | 8.46 | 9.85 |
| (2) ν 4a | 74.00 | 71.97 | 70.97 | 75.74 | 64.37 | 74.74 |
| (3) ν 5a | 64.20 | 64.14 | 64.14 | 64.14 | 60.67 | 64.14 |

TABLE 19-continued

|  | EXAMPLE 1 | EXAMPLE 2 | EXAMPLE 3 | EXAMPLE 4 | EXAMPLE 5 | EXAMPLE 6 |
|---|---|---|---|---|---|---|
| (4) (R4f + R4r)/(R4f − R4r) | 4.69 | 4.38 | 4.34 | 4.53 | 5.78 | 5.43 |
| (5) f5/fw | 5.00 | 4.64 | 4.55 | 4.82 | 5.05 | 4.49 |
| (6) Bf/fw | 2.01 | 2.01 | 1.94 | 2.00 | 1.93 | 1.93 |
| (7) 2ω | 77.80 | 78.00 | 78.00 | 80.20 | 76.80 | 76.80 |

Figure 12:
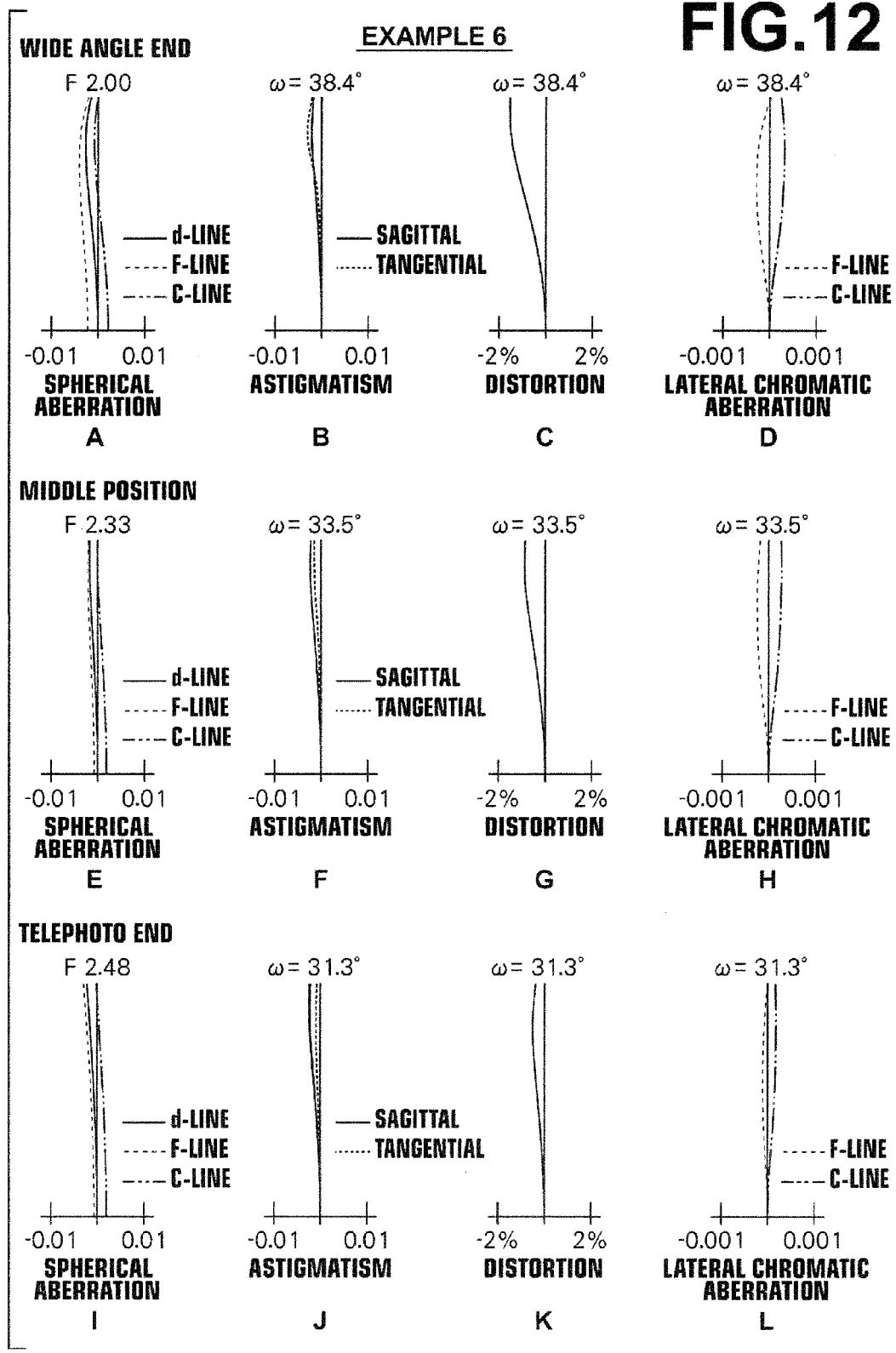
FIG. 12, Sections A through L are aberration diagrams of the zoom lens for projection in Example 6.

Meanwhile, FIG. 12, Sections A through L illustrate aberration diagrams of the zoom lens for projection in Example 6.

So far, the present invention has been described by using embodiments and examples. However, the zoom lens for projection of the present invention is not limited to the aforementioned examples, and various modifications of the mode are possible. For example, a curvature radius, a distance between surfaces, a refractive index, and an Abbe number of each lens may be appropriately modified.

Further, the structure of the projection-type display apparatus of the present invention is not limited to the aforementioned structure. For example, light valves and optical members used to separate or combine rays are not limited to the structures that have been described already, and various modifications of the mode are possible.

What is claimed is:

1. A zoom lens for projection substantially consisting of:
a first lens group having negative refractive power;
a second lens group having positive refractive power;
a third lens group having positive refractive power;
a fourth lens group having positive refractive power; and
a fifth lens group having positive refractive power, which are arranged in this order from a magnification side,
wherein the zoom lens is configured to be telecentric on a reduction side, and
wherein the zoom lens is configured in such a manner that the first lens group and the fifth lens group are fixed while the second lens group through the fourth lens group move along an optical axis during magnification change, and
wherein the fourth lens group includes at least three positive lenses, and
wherein a most-magnification-side lens in the fourth lens group has a convex surface facing the magnification side, and
wherein the following conditional formulas (1) and (7) are satisfied:

$$7.5 < f4/fw < 14.5 \quad (1); \text{ and}$$

$$70° \leq 2\omega \quad (7), \text{ where}$$

fw: a focal length of an entire system at a wide angle end,
f4: a focal length of the fourth lens group, and
2ω: a full angle of view at a wide angle end.

2. The zoom lens for projection, as defined in claim 1, wherein the following conditional formula (1') is satisfied:

$$8.0 < f4/fw < 13.0 \quad (1').$$

3. The zoom lens for projection, as defined in claim 1, comprising:
an inner focus structure in which focusing is performed by moving, in a direction of the optical axis, only two lenses present on a reduction side in the first lens group.

4. A projection-type display apparatus comprising:
a light source;
a light valve;
an illumination optical unit that guides rays from the light source to the light valve; and
the zoom lens for projection, as defined in claim 1,
wherein the display apparatus includes a structure in which light modulation is performed on the rays from the light source at the light valve, and the rays are projected onto a screen by the zoom lens for projection.

5. The zoom lens for projection, as defined in claim 1, wherein the following conditional formula (2) is satisfied:

$$60.0 < \nu 4a \quad (2), \text{ where}$$

ν4a: an average of Abbe numbers of positive lenses included in the fourth lens group for d-line.

6. The zoom lens for projection, as defined in claim 5, wherein the following conditional formula (2') is satisfied:

$$62.0 < \nu 4a \quad (2').$$

7. The zoom lens for projection, as defined in claim 1, wherein the following conditional formula (3) is satisfied:

$$50.0 < \nu 5a \quad (3), \text{ where}$$

ν5a: an average of an Abbe number or numbers of a positive lens or lenses included in the fifth lens group for d-line.

8. The zoom lens for projection, as defined in claim 7, wherein the following conditional formula (3') is satisfied:

$$55.0 < \nu 5a \quad (3').$$

9. The zoom lens for projection, as defined in claim 1, wherein the following conditional formula (4) is satisfied:

$$2.5 < (R4f + R4r)/(R4f - R4r) < 7.0 \quad (4), \text{ where}$$

R4f: a curvature radius of a magnification-side surface of the most-magnification-side lens or a most-magnification-side lens unit in the fourth lens group, and
R4r: a curvature radius of a reduction-side surface of the most-magnification-side lens or the most-magnification-side lens unit in the fourth lens group.

10. The zoom lens for projection, as defined in claim 9, wherein the following conditional formula (4') is satisfied:

$$3.5 < (R4f + R4r)/(R4f - R4r) < 6.5 \quad (4').$$

11. The zoom lens for projection, as defined in claim 1, wherein the following conditional formula (5) is satisfied:

$$3.0 < f5/fw < 7.0 \quad (5), \text{ where}$$

fw: a focal length of an entire system at a wide angle end, and
f5: a focal length of the fifth lens group.

12. The zoom lens for projection, as defined in claim 11, wherein the following conditional formula (5') is satisfied:

$$3.5 < f5/fw < 6.0 \quad (5').$$

13. The zoom lens for projection, as defined in claim 1, wherein the following conditional formula (6) is satisfied:

$$1.5 < Bf/fw < 3.0 \quad (6), \text{ where}$$

fw: a focal length of an entire system at a wide angle end, and

Bf: a back focus of the entire system when a distance in air is used.

14. The zoom lens for projection, as defined in claim 13, wherein the following conditional formula (6') is satisfied:

$$1.7 < Bf/fw < 2.5 \qquad (6').$$

* * * * *